(12) United States Patent
Katakura et al.

(10) Patent No.: US 7,206,138 B2
(45) Date of Patent: Apr. 17, 2007

(54) ZOOM LENS, AND ELECTRONIC IMAGING SYSTEM INCORPORATING THE SAME

(75) Inventors: Masahiro Katakura, Hachioji (JP); Hideyuki Nagaoka, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/928,391

(22) Filed: Aug. 30, 2004

(65) Prior Publication Data
US 2005/0046959 A1 Mar. 3, 2005

(30) Foreign Application Priority Data

Aug. 28, 2003 (JP) .............................. 2003-303983
Aug. 28, 2003 (JP) .............................. 2003-303984

(51) Int. Cl.
*G02B 15/14* (2006.01)

(52) U.S. Cl. ..................................... 359/689; 359/683

(58) Field of Classification Search ................ 359/689, 359/681, 683
See application file for complete search history.

(56) References Cited

U.S. PATENT DOCUMENTS 6,243,213 B1 * 6/2001 Mori ........................... 359/681

| 6,515,804 | B2 | 2/2003 | Watanabe et al. | 359/689 |
| 6,710,934 | B2 * | 3/2004 | Park | 359/689 |
| 2003/0072085 | A1 | 4/2003 | Mizuguchi et al. | 359/680 |
| 2003/0133202 | A1 | 7/2003 | Watanabe et al. | 359/689 |

FOREIGN PATENT DOCUMENTS

JP 2002-072093 3/2002

* cited by examiner

*Primary Examiner*—Ricky Mack
*Assistant Examiner*—Jack Dinh
(74) *Attorney, Agent, or Firm*—Kenyon & Kenyon LLP

(57) ABSTRACT

The invention relates to a small-format, low-cost zoom lens that can gain sufficient telecentricity and aberration performance even with the use of an inexpensive vitreous material, and so lends itself to an electronic image pickup device. The zoom lens comprises a first lens group G1 of negative refracting power, a second lens group G2 of positive refracting power and a third lens group G3 of positive refracting power. For zooming, the lens groups are moved with a change in the spacing between adjacent lens groups. The second lens group G2 comprises a first lens of positive refracting power, a second lens of positive refracting power and a third lens group of negative refracting power, and has three lenses in all. The third lens group G3 comprises a positive lens that is of meniscus shape convex toward an image plane of the zoom lens system and satisfies condition (3), $n \leq 1.53$.

39 Claims, 15 Drawing Sheets

ZOOM LENS, AND ELECTRONIC IMAGING SYSTEM INCORPORATING THE SAME

This application claims benefits of Japanese Application Nos. 2003-303983 and 20-303984 filed in Japan on 8.28, 2003, the contents of which are incorporated by this reference.

BACKGROUND OF THE INVENTION

The present invention relates generally to a small-format zoom lens, and more particularly to a zoom lens lending itself to compact electronic imaging systems having an electronic imaging device, such as digital cameras, and an electronic imaging system incorporating such a zoom lens.

So far, digital cameras or video cameras require high-quality yet low-cost optical systems like those used on common cameras. In addition, it is still desirable to rely on an optical system showing improved telecentricity on its image side to counteract decreases in the quantity of rim light. For instance, three-group zoom lenses set forth in Patent Publications 1 and 2 are known to be fit for electronic image pickup devices such as solid-state image pickup devices. These three-group zoom lenses are each made up of, in order from its object side, a first lens group of negative refracting power, a second lens group of positive refracting power and a third lens group of positive refracting power, wherein the first and second lens groups are moved from the wide-angle end to the telephoto end thereof for zooming purposes.

Patent Publication 1 JP-A 2003-15035
Patent Publication 2 JP-A 2001-318311

However, such three-group zoom lenses are now found to have some shortcomings such as difficulty in gaining sufficient telecentricity, unavoidable use of costly vitreous materials, or grave influences of decentration.

With such prior art zoom lenses, correction of chromatic aberrations at the second lens group is still unsuccessful, often causing reproduced images to have noticeable chromatic blurs due to the broad photosensitivity of an electronic image pickup device in long or short wavelength regions.

SUMMARY OF THE INVENTION

In view of such problems with the prior art as mentioned above, the present invention has for its object the provision of a small-format zoom lens well fit for use with electronic imaging devices, which are capable of gaining satisfactory telecentricity and aberration performance.

According to the first aspect of the invention, this object is accomplished by the provision of a zoom lens system, characterized by comprising, in order from an object side thereof, a first lens group of negative refracting power, a second lens group of positive refracting power and a third lens group of positive refracting power, in which zooming is carried out by each movement of the first, the second, and the third lens group with a change in each space between adjacent lens groups, wherein:

said second lens group comprises three lenses inclusive of, in order from an object side thereof, a first lens of positive refracting power, a second lens of positive refracting power and a third lens of negative refracting power, wherein said third lens group comprises a positive lens that is of meniscus shape convex on an image side thereof and satisfies the following condition:

$$n \leq 1.53 \tag{3}$$

where n is the refractive index of the positive lens in the third lens group.

Advantages and actions of the first zoom lens system constructed according to the first aspect of the invention are now explained.

According to the first aspect of the invention, there is provided a zoom lens system comprising a first lens group of negative refracting power, a second lens group of positive refracting power and a third lens group of positive refracting power in this order. Changing the spacing between the first lens group of negative refracting power and the second lens group of positive refracting power gives a chief zooming function to the zoom lens system, and movement of the third lens group of positive refracting power located on the image side of the zoom lens system makes a light beam nearly telecentric. Thus, the zoom lens system of the invention is well fit for use with an electronic imaging device.

Such a three-group zoom lens system of –++ construction in particular allows the second lens group to take on its chief zooming function.

On the other hand, for diminishing the size of the zoom lens system, it is preferable to use fewer lenses in the second lens group, and for maintaining high zoom ratios, it is preferable to locate the principal points of the second lens group on the object side of the zoom lens system whenever possible.

In the zoom lens system according to the first aspect of the invention, therefore, the second lens group is made up of three lenses, i.e., a positive lens, a positive lens and a negative lens in order from the object side thereof, wherein positive refracting power is allocated to two positive lenses to bring the principal points of the second lens group nearer to the object side of the zoom lens system while spherical aberrations and coma are well balanced. Then, the third lens group is made up of a positive lens that is of meniscus shape convex on its image plane side, thereby keeping the angle of incidence of light rays on the third lens group so small that off-axis aberrations in particular are held back to make satisfactory correction for the whole balance among aberrations by cooperation with the second lens group.

Moreover, because the third lens group is made up of the positive lens of meniscus shape that is convex on its image plane side, the distance between a stop and the principal points of the third lens group is made so long relative to the spacing between the stop and the third lens group that telecentricity can be easily ensured at a wide-angle end thought of as being difficult to set tele-centricity right.

Especially if the positive lens in the third lens group is formed of a vitreous material having a refractive index of as low as defined by condition (3), aberrations can then be held back at the third lens group alone, making it easier to attain a proper aberration balance throughout the zoom lens system.

Exceeding the upper limit of 1.53 to condition (3) causes aberrations to be likely to occur at the third lens group.

The second zoom lens according to the first aspect of the invention is characterized in that the third lens group in the first zoom lens system satisfies the following condition (3-1).

$$1.44 < n \leq 1.53 \tag{3-1}$$

Advantages and actions of the second zoom lens system constructed according to the first aspect of the invention are now explained.

It is preferable to set the lower limit to condition (3); in other words, it is preferable to make use of a vitreous material having a refractive index of greater than 1.44. A vitreous material having a refracting index coming short of the lower limit of 1.44 to condition (3) would be difficult to obtain at low costs.

The third zoom lens system according to the first aspect of the invention is characterized by comprising, in order from an object side thereof, a first lens group of negative refracting power, a second lens group of positive refracting power and a third lens group of positive refracting power, in which zooming is carried out by each movement of the first, the second, and the third lens group with a change in each space between adjacent lenses, wherein:

said second lens group comprises three lenses inclusive of, in order from its object side, a first lens of positive refracting power, a second lens that is of double-convex shape and positive refracting power and a third lens that is of double-concave shape and negative refracting power, wherein said second lens and said third lens are cemented together into a cemented lens, and said third lens group comprises a positive lens that is of meniscus shape convex toward an image plane of the zoom lens system.

Advantages and actions of the third zoom lens system constructed according to the first aspect of the invention are now explained.

Like the first zoom lens, the second zoom lens has telecentricity well balanced against the overall correction of aberrations by contriving the arrangement of the second and third lens groups.

Moreover, the second zoom lens is less likely to decentrate because the double-convex positive lens and double-concave negative lens in the second lens group are cemented together. In particular, the cemented lens consisting of a combined double-convex positive lens and double-concave negative lens is effective for correction of chromatic aberrations, etc., ensuring that various aberrations are well corrected.

The fourth zoom lens system according to the first aspect of the invention is characterized in that said cemented lens in the third zoom lens system satisfies the following conditions (A-1) and (B-1).

$$1.0 < r_{1c}/f_W < 1.2 \quad \text{(A-1)}$$

$$-0.72 < r_{1c}/r_c < -0.40 \quad \text{(B-1)}$$

Here, $r_{1c}$ is the axial radius of curvature of the entrance surface of the cemented lens in the second lens group, $r_c$ is the axial radius of curvature of the cementing surface in the cemented lens in the second lens group, and $f_W$ is the focal length of the zoom lens system at a wide-angle end.

Advantages and actions of the fourth zoom lens system constructed according to the first aspect of the invention are now explained.

If the object side-convex surface of the cemented lens is designed to become strong while the action of the double-convex and double-concave lenses on correction of chromatic aberrations is kept intact, the positive refracting power of the first lens in the second lens group can then become weak, resulting in satisfactory correction of spherical aberrations.

Specifically, it is desirable to satisfy both conditions (A-1) and (B-1) (as embodied in Example 1 given later).

As the lower limit of 1.0 to condition (A-1) is not reached, the radius of curvature of the entrance surface of the cemented lens becomes too small, leading to the likelihood of aberrations, and as the upper limit of 1.2 is exceeded, the positive refracting power of the entrance surface of the cemented lens becomes too weak to correct aberrations at that surface.

If the lower limit of −0.72 to condition (B-1) is not reached where condition (A-1) is satisfied, the radius of curvature of the cementing surface becomes small, rendering the axial lens thickness of the positive lens likely to become large. If the upper limit of −0.40 is exceeded, there is then a decreased effect on correction of aberrations.

The fifth zoom lens system according to the first aspect of the invention is characterized in that said cemented lens in the third zoom lens system satisfies the following (A-2) and (B-2).

$$2.0 < r_{1c}/f_W < 4.0 \quad \text{(A-2)}$$

$$-6.0 < r_{1c}/r_c < -1.6 \quad \text{(B-2)}$$

Here, $r_{1c}$ is the axial radius of curvature of the entrance surface of the cemented lens in the second lens group, $r_c$ is the axial radius of curvature of the cementing surface in the cemented lens in the second lens group, and $f_W$ is the focal length of the zoom lens system at a wide-angle end.

Advantages and actions of the fifth zoom lens system constructed according to the first aspect of the invention are now explained.

If the object side-convex surface of the cemented lens is designed to become weak while the ability of the double-convex and double-concave lens to correct chromatic aberrations is kept intact, it is then possible to reduce influences of decentration on the cemented lens to some considerable extent.

Specifically, it is desirable to satisfy the above conditions (A-2) and (B-2) (as embodied in Example 2 given later).

As the lower limit of 2.0 to condition (A-2) is not reached, the radius of curvature of the entrance surface of the cemented lens becomes small and so influences of decentration on the cemented lens come out. As the upper limit of 4.0 is exceeded, the positive refracting power of the second lens becomes too weak; that is, the first lens must have a larger positive refracting power.

If the lower limit of −6.0 to condition (B-2) is not reached where condition (A-2) is satisfied, the radius of curvature of the cementing surface then becomes small, rendering processing of the cemented lens difficult. If the upper limit of −1.6 is exceeded, the positive refracting power of the second lens becomes too weak; that is, the first lens must have a larger positive refracting power.

Here, the values of $r_{1c}/f_W$ and $r_{1c}/r_c$ in Examples 1 and 2 are given.

|  | Example 1 | Example 2 |
|---|---|---|
| $r_{1c}/f_W$ | 1.17 | 2.19 |
| $r_{1c}/r_c$ | −0.67 | −1.80 |

The sixth zoom lens system according to the first aspect of the invention is characterized in that, in any one of the $1^{st}$ to $5^{th}$ zoom lens systems, said positive lens in said third lens group has an image side-surface comprising an aspheric surface.

Advantages and actions of the $6^{th}$ zoom lens system constructed according to the first aspect of the invention are now explained.

The curvature of the image side-surface in the third lens group tends to become strong; if an aspheric surface is used at that surface, it is then possible to make better correction for field of curvature and distortion.

The 7th zoom lens system according to the first aspect of the invention is characterized in that, in any one of the 1st to 6th zoom lens systems, the positive lens in said third lens group satisfies the following condition (1).

$$0.4 < (R_1 - R_2)/(R_1 + R_2) < 0.89 \tag{1}$$

Here $R_1$ is the axial radius of curvature of the object side-surface of the positive lens in the third lens group, and $R_2$ is the axial radius of curvature of the image side-surface of the positive lens in the third lens group.

Advantages and actions of the 7th zoom lens system constructed according to the first aspect of the invention are now explained.

Condition (1) is provided to define the shape of the positive lens in the third lens group, which is more preferable for correction of aberrations. As the upper limit of 0.89 to condition (1) is exceeded, the exit angle of light from the third lens group toward the image plane tends to become large, rendering correction of coma, etc. difficult. As the lower limit of 0.4 is not reached, it is difficult to give sufficient power to the third lens group.

More preferably, the lower limit is set at 0.6, especially 0.65 or, alternatively, the upper limit is set at 0.87, especially 0.72.

For instance, it is more preferable to satisfy the following condition (1-1) (as embodied by the 8th zoom lens system according to the first aspect of the invention).

$$0.65 < (R_1 - R_2)/(R_1 + R_2) < 0.87 \tag{1-1}$$

The 9th zoom lens system according to the first aspect of the invention is characterized in that, in any one of the 1st to 8th zoom lens systems, said second lens group satisfies the following condition (2).

$$0.38 < d_1/(d_1 + d_2 + d_3) < 0.65 \tag{2}$$

Here $d_1$ is the axial thickness of the first lens in the second lens group, $d_2$ is the axial thickness of the second lens in the second lens group, and $d_3$ is the axial thickness of the third lens in the second lens group.

Advantages and actions of the 9th zoom lens system constructed according to the first aspect of the invention are now explained.

As defined above, $d_1$, $d_2$ and $d_3$ are the axial thicknesses of the lenses in the second lens groups, arranged in order from the object side of the zoom lens system, respectively. As the lower limit of 0.38 to condition (2) is not reached, the value of spherical aberrations at the telephoto end in general and at the telephoto end in particular on tight close-up is largely shifted to a minus side where good correction of aberrations becomes difficult. As the upper limit of 0.65 to condition (2) is exceeded, the lens located nearest to the object side in the second lens group becomes too thick, often resulting in fabrication cost rises.

More preferably, the lower limit should be set at 0.40, especially 0.45, and the upper limit at 0.60, especially 0.55.

The 10th zoom lens according to the first aspect of the invention is characterized in that, in the 9th zoom lens system, an aperture stop is positioned on an object side of said second lens, and the first and second lenses in said second lens group are a double-convex lens and a positive lens convex on its object side, respectively.

Advantages and actions of the 10th zoom lens system constructed according to the first aspect of the invention are now explained.

This arrangement provides an appropriate separation of the aperture stop from a chief positive refracting power of the second lens group, and an image of the aperture stop by the second lens group is formed at a far position on the object side, so that telecentricity is more easily obtainable.

The 11th zoom lens system according to the first aspect of the invention is characterized in that, in any one of the 1st to 10th zoom lens systems, the third lens in said lens group has an image side-surface formed of a concave surface, and satisfies the following condition (C).

$$0.05 < d_3/(d_1 + d_2 + d_3) < 0.14 \tag{C}$$

Here $d_1$ is the axial thickness of the first lens in the second lens group, $d_2$ is the axial thickness of the second lens in the second lens group, and $d_3$ is the axial thickness of the third lens in the second lens group.

Advantages and actions of the 11th zoom lens system constructed according to the first aspect of the invention are now explained.

Condition (C) is provided to define an appropriate position of the image side-concave surface of the negative lens in the second lens group. As the lower limit of 0.05 to condition (C) is not reached, the exit surface of the negative lens comes too close to the positive lens, becoming less effective for positioning the principal points on the object side. As the upper limit of 0.14 is exceeded, the negative refracting surface in the second lens group is spaced too away from the positive refracting surface therein, resulting in the likelihood of aberrations.

Here, the values of $d_3/(d_1 + d_2 + d_3)$ in Examples 1 and 2, described later, are given.

|  | Example 1 | Example 2 |
| --- | --- | --- |
| $d_3/(d_1 + d_2 + d_3)$ | 0.12 | 0.11 |

The 12th zoom lens system according to the first aspect of the invention is characterized in that, in any one of the 3rd to 5th zoom lens systems, said third lens group comprises a positive lens that is of meniscus shape convex toward the image plane and satisfies the following condition (3).

$$n \leq 1.53 \tag{3}$$

Here n is the refractive index of the positive lens in the third lens group.

Advantages and actions of the 12th zoom lens system constructed according to the first aspect of the invention are now explained.

By use of a vitreous material having a refractive index of as low as can satisfy condition (3) in the third lens group, it is possible to prevent aberrations from occurring at the third lens group alone.

As the upper limit of 1.53 to condition (3) is exceeded, aberrations are likely to occur at the third lens group.

The 13th zoom lens system according to the first aspect of the invention is characterized in that, in any one of the 3rd to 5th zoom lens systems, the positive lens in said third lens group is a plastic lens.

Advantages and actions of the 13th zoom lens system constructed according to the first aspect of the invention are now explained.

By use of the plastic lens in the third lens group, it is possible to achieve an inexpensive, high-quality, high-performance zoom lens system.

In the first aspect of the invention, it is preferable to use a plastic lens for the positive lens in the third lens group in particular, because low refractive indices are easily obtainable, and processing for meniscus shape and aspheric surface is easily achievable as well.

The 14$^{th}$ zoom lens system according to the first aspect of the invention is characterized in that, in any one of the 1$^{st}$ to 13$^{th}$ zoom lens systems, said third lens group moves upon zooming from the wide-angle end to the telephoto end, and satisfies the following conditions (4) and (D).

$$0 < (L_1 + L_2)/f_W < 1.6 \quad (4)$$

$$2.5 \leq f_T/f_W \quad (D)$$

Here $f_W$ is the focal length of the zoom lens system at the wide-angle end, $f_T$ is the focal length of the zoom lens system at the telephoto end, $L_1$ is the absolute quantity of a difference between the position of the third lens group at the wide-angle end and the position of the third lens group in an intermediate focal length state, provided that the focal length of the zoom lens system in the intermediate focal length state is given by $(f_W \cdot f_T)^{1/2}$ and $L_2$ is the absolute quantity of a difference between the position of the third lens group in the intermediate focal length state and the position of the third lens group at the telephoto end, provided that the focal length of the zoom lens system in the intermediate focal length state is given by $(f_W \cdot f_T)^{1/2}$.

Advantages and actions of the 14$^{th}$ zoom lens system constructed according to the first aspect of the invention are now explained.

The position of the exit pupil is adjusted by movement of the third lens group, so that it is easy to gain telecentricity with respect to the image pickup plane side. Especially if the amount of movement of the third lens group satisfies condition (4), there is then no significant variation in the angle of incidence of light on the third lens group upon zooming, and aberrations remain well balanced. This means that aberrations are well corrected although high zoom ratios that satisfy condition (D) are maintained.

As the amount of movement of the third lens group exceeds the upper limit of 1.6 to condition (4), the amount of movement of the third lens group from the wide-angle end to the telephoto end becomes large, resulting in a significant change in the angle of incidence of light on the third lens group upon zooming. Consequently, aberrations from the wide-angle end to the telephoto end are apt to be placed in an ill-balanced state, rendering satisfactory correction of aberrations difficult.

It is noted that falling short of the lower limit of 0 to condition (4) links to the need of a more complicated mechanism for movement of just only the third lens group but other lens groups as well.

More preferably, the upper limit should be set at 1.1, especially 1.0, because a sensible tradeoff is easily obtainable between correction of the position of the exit pupil and correction of aberrations, and the lower limit should be set at 0.3, especially 0.6 because it is easy to gain telecentricity due to the movement of the third lens group.

Here, the values of $f_T/f_W$ in Examples 1 and 2, described later, are given.

|  | Example 1 | Example 2 |
|---|---|---|
| $f_T/f_W$ | 2.89 | 2.89 |

The 15$^{th}$ zoom lens system according to the first aspect of the invention is characterized in that, in any one of the 1$^{st}$ to 14$^{th}$ zoom lens systems, said first lens group comprises, in order from an object side thereof, a first lens that is of meniscus shape concave toward the image plane, a second negative lens that is of double-concave shape and a third positive lens that is of meniscus shape convex on its object side, and satisfies the following condition (5).

$$1 < (R_3 - R_4)/(R_3 + R_4) < 2 \quad (5)$$

Here $R_3$ is the axial radius of curvature of the object side-surface of the double-concave negative lens in the first lens group, and $R_4$ is the axial radius of curvature of the image plane side-surface of the double-concave negative lens in the first lens group.

Advantages and actions of the 15$^{th}$ zoom lens system constructed according to the first aspect of the invention are now explained.

This arrangement is preferable for the first lens group adapted to make correction for aberrations with fewer lenses. Especially by using a double-concave negative lens for the second lens in the first lens group, it is possible to make satisfactory correction for higher-order aberrations occurring at the first lens group. This means that a high-image-quality, high-performance zoom lens system can be set up without incorporating any aspheric lens in the first lens group, leading to cost reductions. As the lower limit of 1 to condition (5) is not reached, the angle of incidence of light on the second lens in the first lens group becomes large, leading possibly to the occurrence of large field of curvature, etc. Exceeding the upper limit of 2 renders it difficult to obtain sufficient power.

The 16$^{th}$ zoom lens system according to the first aspect of the invention is characterized in that, in the 15$^{th}$ zoom lens system, refracting surfaces in said first lens group are all formed of spherical surfaces.

Advantages and actions of the 16$^{th}$ zoom lens system constructed according to the first aspect of the invention are now explained.

This arrangement ensures that a high-image-quality, high-performance zoom lens system can be set up without incorporating any aspheric lens in the first lens group, leading to cost reductions.

The 17$^{th}$ zoom lens system according to the first aspect of the invention is characterized in that any one of the 1$^{st}$ to 16$^{th}$ zoom lens systems satisfies the following conditions (6) and (7).

$$\alpha_1/(0.4 \times f_1) < -3.8 \quad (6)$$

$$|f_1/(\alpha_1 + \alpha_2)| < 0.035 \quad (7)$$

Here $f_1$ is the focal length of the first lens group, $\alpha_1$ is the position of the exit pupil as viewed from the image plane when the value of $\beta_2 \times \beta_3$ is $-0.40$, and $\alpha_2$ is the position of the exit pupil as viewed from the image plane when the value of $\beta_2 \times \beta_3$ is $-1.00$, with the proviso that $\beta_2$ is the transverse magnification of the second lens group upon focused at infinity, and $\beta_3$ is the transverse magnification of the third lens group upon focused at infinity.

Advantages and actions of the 17$^{th}$ zoom lens system constructed according to the first aspect of the invention are now explained.

Exceeding the upper limit of $-3.8$ to condition (6) is detrimental to telecentricity in a wide-angle region, often leading to a drop of the quantity of rim rays. To add to this, exceeding the upper limit of 0.035 to condition (7) gives rise to a large difference between telecentricity in the wide-angle region and in that telephoto region, which in turn results in a large change in the quantity of rim rays.

The 18th zoom lens system according to the first aspect of the invention is characterized in that, in any one of the 1st to 17th zoom lens systems, said first lens located nearest to the object side in said second lens group has both surfaces formed of aspheric surfaces.

Advantages and actions of the 18th zoom lens system constructed according to the first aspect of the invention are now explained.

By using aspheric surfaces for both surfaces of the first lens that is the positive lens located nearest to the object side in the second lens group, it is possible to reduce deterioration of performance due to fabrication errors such as decentration occurring during assembling, etc.

The 19th zoom lens system according to the first aspect of the invention is characterized in that any one of the 1st to 18th zoom lens systems further comprises an aperture stop on an object side of the zoom lens system with respect to said first lens located nearest to the object side in said second lens group, wherein said aperture stop is movable together with said second lens group.

Advantages and actions of the 9th zoom lens system constructed according to the first aspect of the invention are now explained.

By arranging the lens groups according to the first aspect of the invention, substantial telecentricity well fit for an electronic image pickup device can be gained even when the aperture stop moves together with the second lens group, and a driving system can be simplified as well by designing the aperture stop to move as a piece therewith.

An electronic imaging system according to the first aspect of the invention is characterized by comprising any one of the 1st to 19th zoom lens systems and an electronic image pickup device located on an image plane side thereof.

Advantages and actions of the electronic imaging system constructed according to the first aspect of the invention are now explained.

The zoom lens system according to the first aspect of the invention is easy to gain substantial telecentricity with size reductions, and so is preferably used with an electronic imaging system provided with an electronic image pickup device (such as a CCD or CMOS) on its image plane side.

According to the second aspect of the invention, the object set forth in the preamble of the present disclosure is accomplished by the provision of a zoom lens system characterized by comprising, in order from an object side thereof, a first lens group of negative refracting power, a second lens group of positive refracting power and a third lens group of positive refracting power in which zooming is carried out by each movement of the first, the second, and the third lens group with a change in a spacing between adjacent lens groups, wherein:

said second lens group comprises three lenses inclusive of, in order from an object side thereof, a first lens of positive refracting power, a second lens of positive refracting power and a third lens of negative refracting power, wherein said second lens and said third lens are cemented together into a cemented lens that satisfies the following condition with respect to the Abbe number of the positive lens therein.

$$\nu_{d1} > 70 \tag{11}$$

Here $\nu_{d1}$ is the Abbe number of the positive lens in the cemented lens in the second lens group.

Advantages and actions of the first zoom lens system according to the second aspect of the invention are now explained.

According to the second aspect of the invention, there is provided a zoom lens system comprising a first lens group of negative refracting power, a second lens group of positive refracting power and a third lens group of positive refracting power in this order. Changing the spacing between the first lens group of negative refracting power and the second lens group of positive refracting power gives a chief zooming function to the zoom lens system, and the third lens group of positive refracting power located on the image side of the zoom lens system allows a light beam to have substantial telecentricity. Thus, the zoom lens system according to the second aspect of the invention is well fit for use with an electronic imaging device.

Such a three-group zoom lens system of –++ construction in particular allows the second lens group to take on its chief zooming function.

On the other hand, for diminishing the size of the zoom lens system, it is preferable to use fewer lenses in the second lens group, and for maintaining high zoom ratios, it is preferable to locate the principal points of the second lens group on the object side of the zoom lens system whenever possible.

In the zoom lens system according to the second aspect of the invention, therefore, the second lens group is made up of three lenses, i.e., a positive lens, a positive lens and a negative lens in order from the object side thereof, wherein positive refracting power is allocated to two positive lenses to bring the principal points of the second lens group nearer to the object side of the zoom lens system while spherical aberrations and coma are well balanced.

Then, the second and third lenses in the second lens group are cemented together for the purpose of holding back decentration and correcting chromatic aberrations. As the Abbe number of the positive lens in the cemented lens is short of the lower limit of 70 to condition (11), correction of longitudinal chromatic aberration and chromatic aberration of magnification becomes difficult. Alternatively, various aberrations tend to stand off balance, for instance, because the power of the negative lens in the second lens group becomes strong. This results in an unreasonable lens arrangement poor in telecentricity.

The second zoom lens system according to the second aspect of the invention is characterized in that the above first zoom lens system satisfies the following condition (11-1).

$$75 > \nu_{d1} > 70 \tag{11-1}$$

Advantages and actions of the second zoom lens system constructed according to the second aspect of the invention are now explained.

A material that has an Abbe number going beyond the upper limit of 75 to condition (11-1) is expensive and difficult to process.

The third zoom lens system according to the second aspect of the invention is characterized in that in either one of the above 1st and 2nd zoom lens systems, said cemented lens in said second lens group satisfies the following condition (12).

$$\nu_{d1} - \nu_{d2} > 45 \tag{12}$$

Here $\nu_{d2}$ is the Abbe number of the negative lens in the cemented lens in the second lens group.

Advantages and actions of the above third zoom lens system constructed according to the second aspect of the invention are now explained.

By using a convex lens of low dispersion and a concave lens of high dispersion for the cemented lens in the second lens group, chromatic aberrations can be well corrected. Being short of the lower limit of 45 to condition (12) means that there is only a slender effect on correction of longitudinal chromatic aberration and chromatic aberration of magnification, and the use of the cemented lens does not stand to reason.

Preferably, the lower limit should be set at 45.

More preferably, the upper limit should be set at 60, especially 50, because an inexpensive material is usable.

For instance, it is desirable to satisfy the following condition (12-1) (as embodied by the fourth zoom lens system according to the second aspect of the invention).

$$60 > v_{d1} - v_{d2} > 45 \tag{12}$$

The fifth zoom lens system according to the second aspect of the invention is characterized in that, in any one of the above $1^{st}$ to $4^{th}$ zoom lens systems, said first lens group comprises, in order from an object side thereof, a first lens that is of meniscus shape concave toward an image plane side of the zoom lens system, a second lens that is of meniscus shape concave toward the image plane side of the zoom lens system and has negative refracting power, and a third lens that is of meniscus shape concave toward the image plane side of the zoom lens system and has positive refracting power.

Advantages and actions of the fifth zoom lens system constructed according to the second aspect of the invention are now explained.

The use of the meniscus lenses concave on their image plane sides for all the lenses in the first lens group is favorable for a wide-angle arrangement, because the angle of incidence of off-axis light rays on each lens is kept so small that aberrations such as field of curvature and distortion can be well held back even with three such lenses.

The sixth zoom lens system according to the second aspect of the invention is characterized in that in the above $5^{th}$ zoom lens system, said third lens group comprises one double-convex positive lens.

Advantages and actions of the sixth zoom lens system constructed according to the second aspect of the invention are now explained.

Imparting positive refracting power to both sides of the third lens group allows the refracting power of the third lens group to be so properly divided that it is easy to make the amount of movement of the third lens group small.

The seventh zoom lens system according to the second aspect of the invention is characterized in that, in any one of the above $1^{st}$ to $6^{th}$ zoom lens systems, either one of the refracting surfaces of the second lens in said first lens group and the object side-surface of said third lens group are formed of aspheric surfaces.

Advantages and actions of the seventh zoom lens system constructed according to the second aspect of the invention are now explained.

The use of the aspheric surface in the first lens group ensures satisfactory correction of distortion and field of curvature, and the use of the aspheric surface for the object side-surface of the third lens group ensures satisfactory correction of spherical aberrations and coma.

The eighth zoom lens system according to the second aspect of the invention is characterized in that, in any one of the above $1^{st}$ to $7^{th}$ zoom lens systems, said first lens group comprises three lenses inclusive of a negative lens, a negative lens and a positive lens, and said third lens group comprises one positive lens, with satisfaction of the following conditions (13-1) and (13-2).

$$n_1 \leq 1.53 \tag{13-1}$$

$$n_3 \leq 1.53 \tag{13-2}$$

Here $n_1$ is the refractive index of the second negative lens in the first lens group, and $n_3$ is the refractive index of the positive lens in the third lens group.

Advantages and actions of the eighth zoom lens system constructed according to the second aspect of the invention are now explained.

If a vitreous material having a refractive index of as low as can satisfy conditions (13-1) and (13-2) is used while the arrangement of the second lens group satisfies condition (11), it is then easy to hold back aberrations throughout the first lens group, the second lens group and the third lens group.

The lower limits to conditions (13-1) and (13-2) could be set at 1.45, whereby aberrations are correctable with a much cheaper vitreous material (as embodied by the ninth zoom lens system according to the second aspect of the invention).

$$1.45 < n_1 \leq 1.53 \tag{13-1}'$$

$$1.45 < n_3 \leq 1.53 \tag{13-2}'$$

The $10^{th}$ zoom lens system according to the second aspect of the invention is characterized in that, in any one of the above $1^{st}$ to $9^{th}$ zoom lens systems, said first lens group comprises three lenses inclusive of a negative lens, a negative lens and a positive lens, and said third lens group comprises one positive lens, wherein the second negative lens in said first lens group and the positive lens in said third lens group are each formed of a plastic lens.

Advantages and actions of the $10^{th}$ zoom lens system constructed according to the second aspect of the invention are now explained.

If a vitreous material having a refractive index of as low as can satisfy conditions (13-1) and (13-2) is used while the arrangement of the second lens group satisfies condition (11), aberrations occurring throughout the first lens group, the second lens group and the third lens group can be held back, and plastic lenses can be used at the above positions as such vitreous material. It is thus possible to achieve an inexpensive, high-image-quality, high-performance zoom lens system The $11^{th}$ zoom lens system according to the second aspect of the invention is characterized in that, in any one of the above $1^{st}$ to $10^{th}$ zoom lens systems, said first lens group comprises three lenses inclusive of a negative lens, a negative lens and a positive lens, wherein the second negative lens in said first lens group satisfies the following condition (14).

$$0.3 < (R_{12o} - R_{12i})/(R_{12o} + R_{12i}) < 0.5 \tag{14}$$

Here $R_{12o}$ is the axial radius of curvature of the object side-surface of the second negative lens in the first lens group, and $R_{12i}$ is the axial radius of curvature of the image plane side-surface of the second negative lens in the first lens group.

Advantages and actions of the $11^{th}$ zoom lens system constructed according to the second aspect of the invention are now explained.

As the lower limit of 0.3 to condition (14) is not reached, the angle of incidence of light on the second negative lens in the first lens group becomes large, leading to an increased field of curvature, etc. Exceeding the upper limit of 0.5 is not preferable because of the inability to obtain any sufficient power.

More preferably, the lower limit should be set at 0.33, especially 0.35, and the upper limit should be set at 0.45, especially 0.42.

The 12$^{th}$ zoom lens system according to the second aspect of the invention is characterized in that, in any one of the above 1$^{st}$ to 11$^{th}$ zoom lens systems, said third lens group comprises one positive lens that satisfies the following condition (15).

$$1.1 < (R_{3o} - R_{3i})/(R_{3o} + R_{3i}) < 2.0 \quad (15)$$

Here $R_{3o}$ is the axial radius of curvature of the object side-surface of the positive lens in the third lens group, and $R_{3i}$ is the axial radius of curvature of the image plane side-surface of the positive lens in the third lens group.

Advantages and actions of the 12$^{th}$ zoom lens system constructed according to the second aspect of the invention are now explained.

As the upper limit of 2.0 to condition (15) is exceeded, the exit angle of light from the third lens group onto the image plane becomes large, resulting in an increased coma, etc., and as the lower limit of 1.1 is not reached, it is impossible to obtain any sufficient power for gaining telecentricity.

More preferably, the lower limit should be set at 1.2, especially 1.25, and the upper limit should be set at 1.4, especially 1.3.

The 13$^{th}$ zoom lens system according to the second aspect of the invention is characterized in that, in any one of the above 1$^{st}$ to 12$^{th}$ zoom lens systems, the positive lens located nearest to the object side in said second lens group includes an aspheric surface.

Advantages and actions of the 13$^{th}$ zoom lens system constructed according to the second aspect of the invention are now explained.

The provision of the aspheric surface on the positive lens located nearest to the object side in the second lens group is effective for correction of spherical aberrations.

The 14$^{th}$ zoom lens system according to the second aspect of the invention is characterized in that any one of the above 1$^{st}$ to 13$^{th}$ zoom lens systems further comprises an aperture stop on an object side of the zoom lens system with respect to said first lens located nearest to the object side in said second lens group, wherein said aperture stop is movable together with said second lens group.

Advantages and actions of the 14$^{th}$ zoom lens system constructed according to the second aspect of the invention are now explained.

By arranging the lens groups according to the second aspect of the invention, substantial telecentricity well fit for an electronic image pickup device can be gained even when the aperture stop moves together with the second lens group, and a driving system can be simplified as well by designing the aperture stop to move as a piece therewith.

The 15$^{th}$ zoom lens system according to the second aspect of the invention is characterized in that, in any one of the above 1$^{st}$ to 14$^{th}$ zoom lens systems, said first lens group, said second lens group and said third lens group move during zooming.

Advantages and actions of the 15$^{th}$ zoom lens system constructed according to the second aspect of the invention are now explained.

The zoom lens system according to the second aspect of the invention has chiefly the first and second lens groups involved in zooming action. In this arrangement, if the third lens group is moved, it is then easy to adjust the position of the exit pupil.

An electronic imaging system according to the second aspect of the invention is characterized by comprising any one of the 1$^{st}$ to 15$^{th}$ zoom lens systems according to the second aspect of the invention and an electronic image pickup device located on an image plane side thereof.

Advantages and actions of the electronic imaging system constructed according to the second aspect of the invention are now explained.

The zoom lens system according to the second aspect of the invention is easy to gain substantial tele-centricity with size reductions, and so is preferably used with an electronic imaging system provided with an electronic image pickup device (such as a CCD or CMOS) on its image plane side.

In accordance with the first aspect of the invention, it is possible to obtain a small-format, low-cost zoom lens system that is capable of gaining sufficient tele-centricity and aberration performance and so lends itself to an electronic image pickup device, even with recourse to an inexpensive vitreous material. Moreover, it is possible to obtain a small-format, low-cost zoom lens system that has sufficient tele-centric performance and aberration performance, and is less affected by decentration as well.

In accordance with the second aspect of the invention, it is possible to obtain a small-format zoom lens system that can have sufficient telecentricity and aberration performance, and is well fit for use with an electronic image pickup device.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTIONS OF THE DRAWINGS

FIGS. 1(a), 1(b) and 1(c) are illustrative in lens section of Example 1 of the three-group zoom lens system of the invention at a wide-angle end (a), in an intermediate state (b) and at a telephoto end (c), respectively, upon focused on an object point at infinity.

FIGS. 2(a), 2(b) and 2(c) are sectional views, similar to FIGS. 1(a), 1(b) and 1(c), of Example 2 of the three-group zoom lens system.

FIGS. 3(a), 3(b) and 3(c) are sectional views, similar to FIGS. 1(a), 1(b) and 1(c), of Example 3 of the three-group zoom lens system.

FIGS. 4(a), 4(b) and 4(c) are sectional views, similar to FIGS. 1(a), 1(b) and 1(c), of Example 4 of the three-group zoom lens system.

FIGS. 5(a), 5(b) and 5(c) are sectional views, similar to FIGS. 1(a), 1(b) and 1(c), of Example 5 of the three-group zoom lens system.

FIGS. 6(a), 6(b) and 6(c) are aberration diagrams for Example 1 upon focused on an object point at infinity.

FIGS. 7(a), 7(b) and 7(c) are aberration diagrams for Example 2 upon focused on an object point at infinity.

FIGS. 8(a), 8(b) and 8(c) are aberration diagrams for Example 3 upon focused on an object point at infinity.

FIGS. 9(a), 9(b) and 9(c) are aberration diagrams for Example 4 upon focused on an object point at infinity.

FIGS. 10(*a*), 10(*b*) and 10(*c*) are aberration diagrams for Example 5 upon focused on an object point at infinity.

Figure 17A:
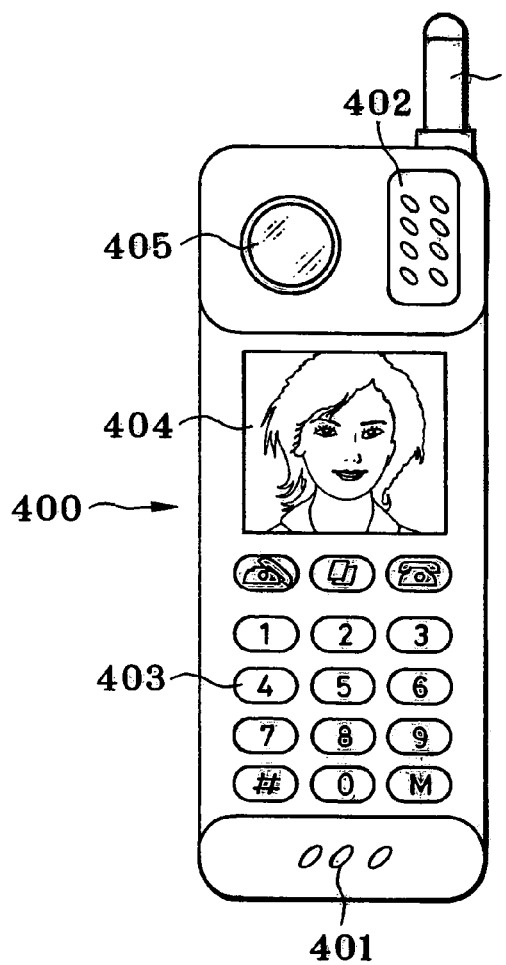
Figure 17B:
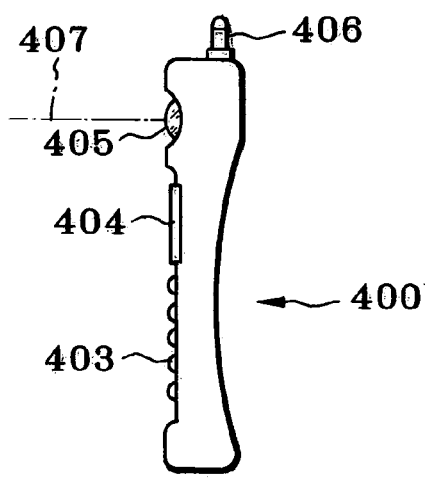
Figure 17C:
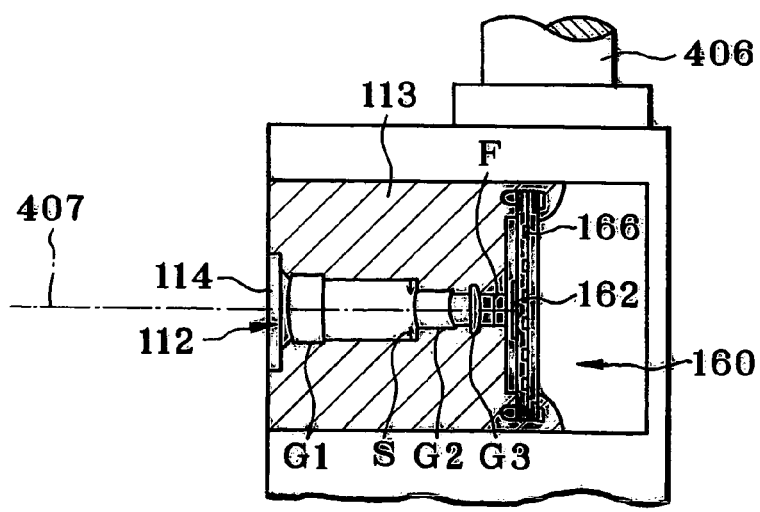

FIGS. 17(*a*) and 17(*b*) are a front view and a side view of a cellular phone in which the three-group zoom lens system of the invention is incorporated as an objective optical system, and FIG. 17(*c*) is a sectional view for a phototaking optical system for it.

DESCRIPTION OF THE PREFERRED EMBODIMENTS

The zoom lens system of the invention is now explained with reference to Examples 1–5. FIGS. 1–5 are illustrative in lens section of Example 1–5 at the wide-angle end (a), in the intermediate state (b) and at the telephoto end (c), respectively, upon focused on an object point at infinity. In these figures, G1 stands for a negative first lens group, G2 a positive second lens group, G3 a positive third lens group, S an aperture stop, P1 and P2 each a plane-parallel plate, I an image plane, and FS a flare stop. The plane-parallel plate P1 of the two plane-parallel plates P1 and P2, located on the object side of the zoom lens system, is constructed of a low-pass filter provided with an IR cut coating and a near ultraviolet cut coating, and the plane-parallel plate P2 located on the image side of the zoom lens system is a cover glass for an image pickup device CCD.

EXAMPLE 1

Figure 1A:
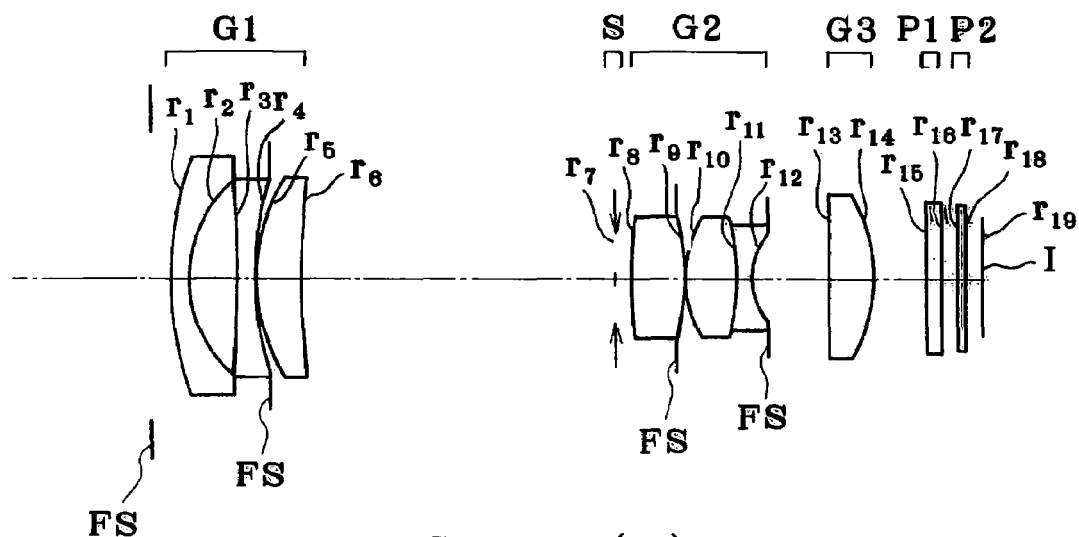
Figure 1B:
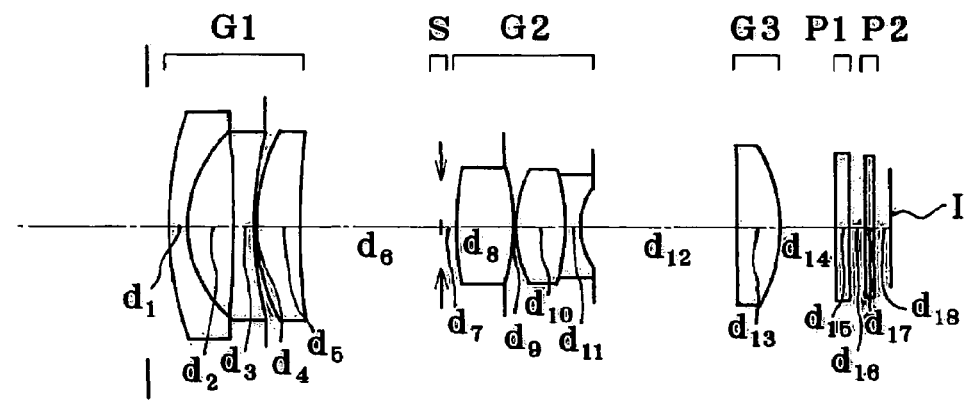
Figure 1C:
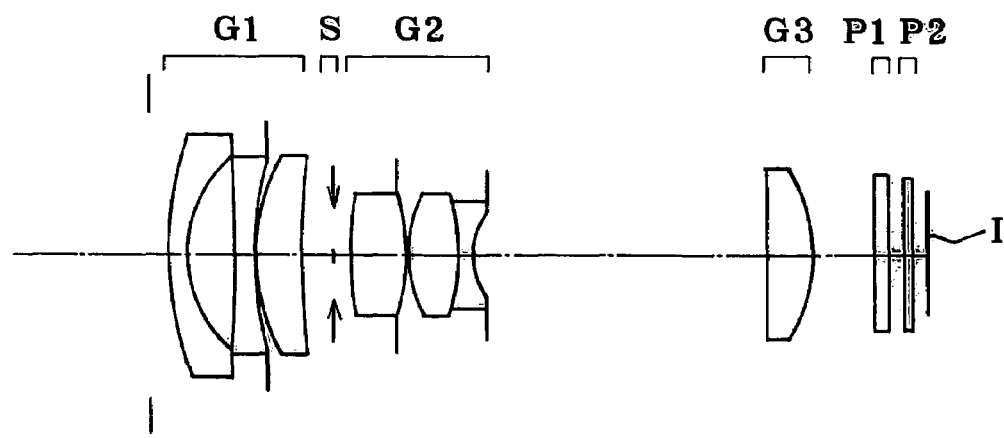

As shown in FIG. 1, the zoom lens system according to this example is made up of, in order from its object side, a negative first lens group G1, an aperture stop S, a positive second lens group G2 and a positive third lens group G3. From the wide-angle end to the telephoto end via an intermediate focal length during focused at infinity, the respective lens groups move as follows. On the way to the image side, the first lens group G1 comes back toward the object side, traveling in such a convex orbit that it is located nearer to the image side at the telephoto end than at the wide-angle end; the second lens group G2 moves monotonously toward the object side together with an object side-aperture stop S; and the third lens group G3 moves toward the image side in such a convex orbit that it is positioned nearest to the image side between the wide-angle end and the intermediate focal length, and nearer to the object side at the telephoto end than at the wide-angle end.

The first lens group G1 consists of three lenses, say, a negative meniscus lens convex on its object side, a double-concave negative lens and a positive meniscus lens convex on its object side, and the second lens group G2 consists of two subgroups or three lenses, say, a double-convex positive lens with aspheric surfaces used at both its surfaces, and a cemented lens consisting of a double-convex positive lens and a double-concave lens. The third lens group G3 consists of one positive meniscus lens convex on its image side, with an aspheric surface used at the image side-surface thereof.

In this example, four flare stops FS for cutting off-axis light beams are located at four sites, say, just before the object side-surface of the negative meniscus lens in the first lens group G1, between the double-concave lens and the positive meniscus lens in the first lens group G1, between the double-convex positive lens and the cemented lens in the second lens group G1, and just before the image side-surface of the cemented lens in the second lens group G2.

EXAMPLE 2

Figure 2A:
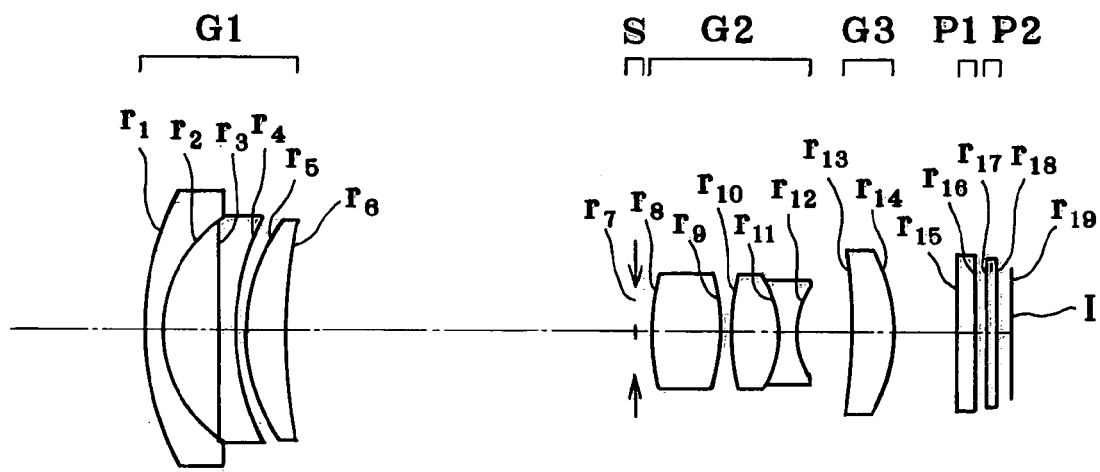
Figure 2B:
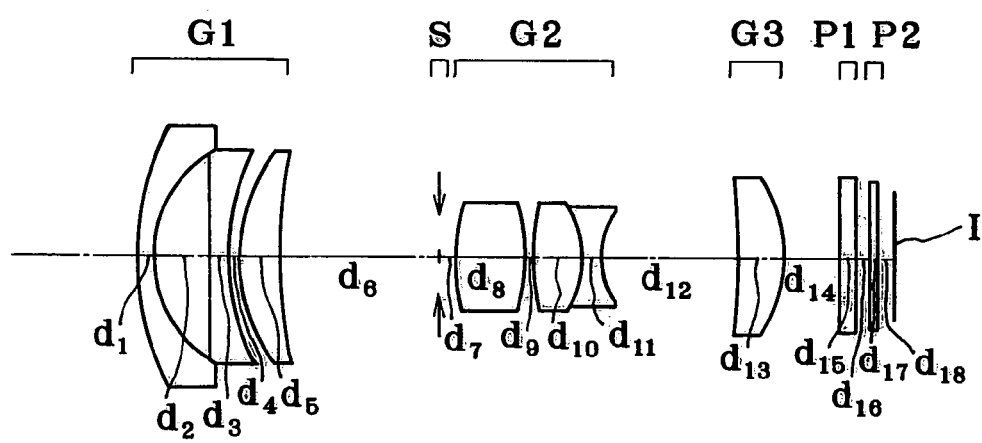
Figure 2C:
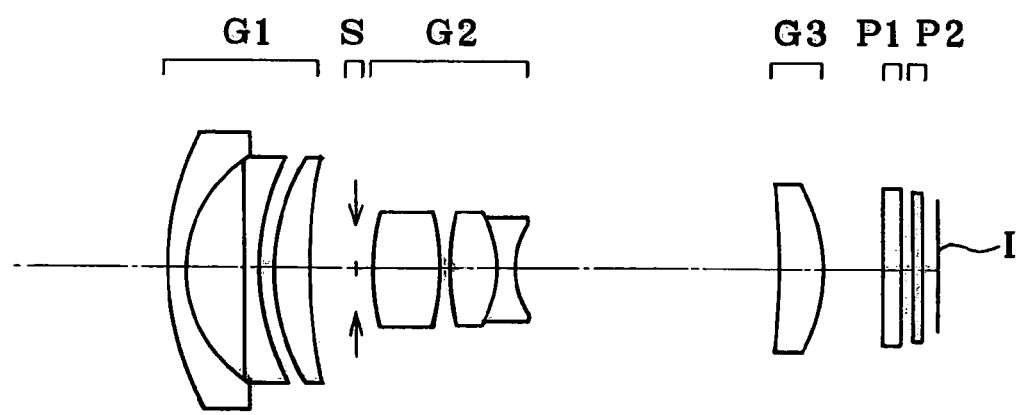

As shown in FIG. 2, the zoom lens system according to this example is made up of, in order from its object side, a negative first lens group G1, an aperture stop S, a positive second lens group G2 and a positive third lens group G3. From the wide-angle end to the telephoto end via an intermediate focal length during focused at infinity, the respective lens groups move as follows. On the way to the image side, the first lens group G1 comes back toward the object side, traveling in such a convex orbit that it is located nearer to the image side at the telephoto end than at the wide-angle end; the second lens group G2 moves monotonously toward the object side together with an object side-aperture stop S; and the third lens group G3 moves toward the image side in such a convex orbit that it is positioned nearest to the image side between the intermediate focal length and the telephoto end, and nearer to the image side at the telephoto end than at the wide-angle end.

The first lens group G1 consists of three lenses, say, a negative meniscus lens convex on its object side, a double-concave negative lens and a positive meniscus lens convex on its object side, and the second lens group G2 consists of two subgroups or three lenses, say, a double-convex positive lens with an aspheric surface used at the object side-surface thereof, and a cemented lens consisting of a double-convex positive lens and a double-concave lens. The third lens group G3 consists of one positive meniscus lens convex on its image side, with an aspheric surface used at the image side-surface thereof.

In both Examples 1 and 2, focusing on near distances is carried out by movement of the third lens group G3 in an axial direction; however, this could be achieved in any desired mode, for instance, by movement of the first lens group G1 or the whole zoom lens system.

EXAMPLE 3

Figure 3A:
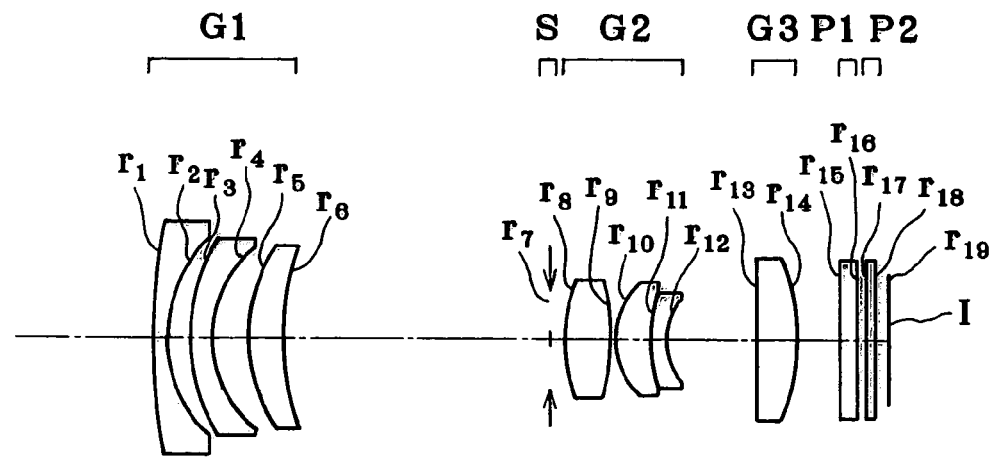
Figure 3B:
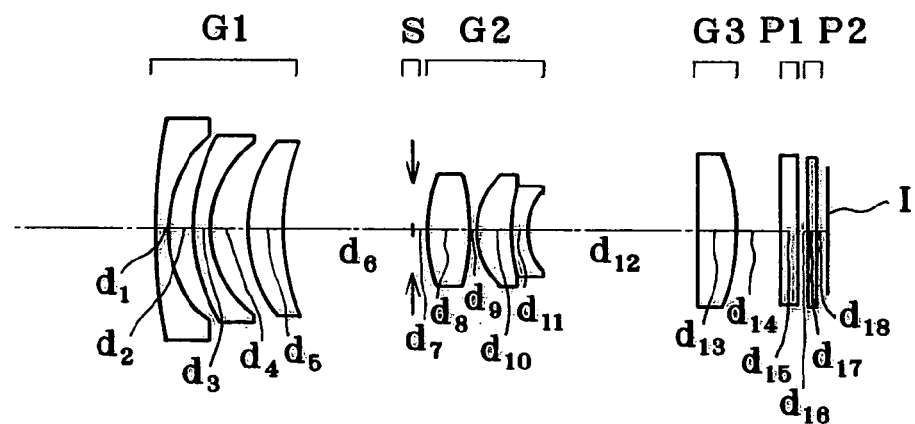
Figure 3C:
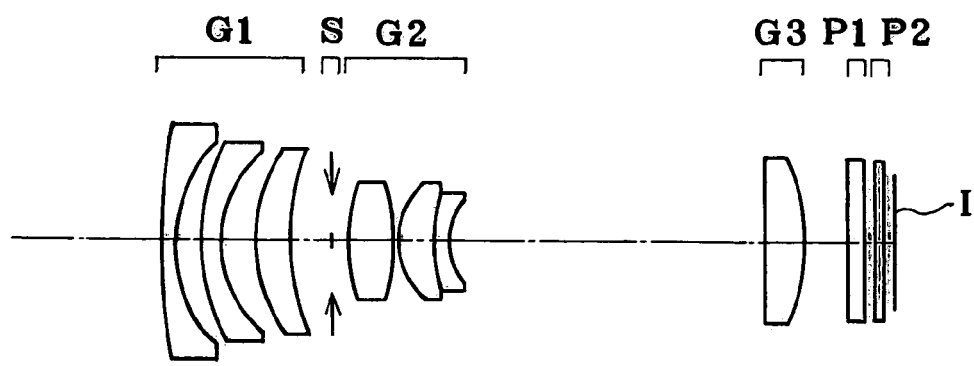

As shown in FIG. 3, the zoom lens system according to this example is made up of, in order from its object side, a negative first lens group G1, an aperture stop S, a positive second lens group G2 and a positive third lens group G3. From the wide-angle end to the telephoto end via an intermediate focal length during focused at infinity, the respective lens groups move as follows. On the way to the image side, the first lens group G1 comes back toward the object side, traveling in such a convex orbit that it is located nearer to the image side at the telephoto end than at the wide-angle end; the second lens group G2 moves monotonously toward the object side together with an object side-aperture stop S; and the third lens group G3 stays fixed.

The first lens group G1 consists of three lenses, say, a negative meniscus lens convex on its object side, a negative meniscus lens convex on its object side with an aspheric surface used at the image side-surface thereof and a positive meniscus lens convex on its object side, and the second lens group G2 consists of two subgroups or three lenses, say, a double-convex positive lens with an aspheric surface used at the object side-surface thereof, and a cemented lens consisting of a positive meniscus lens convex on its object side, with an aspheric surface used at the object side-surface thereof, and a negative meniscus lens convex on its object side. The third lens group G3 consists of one double-convex positive lens convex on its object side.

EXAMPLE 4

Figure 4A:
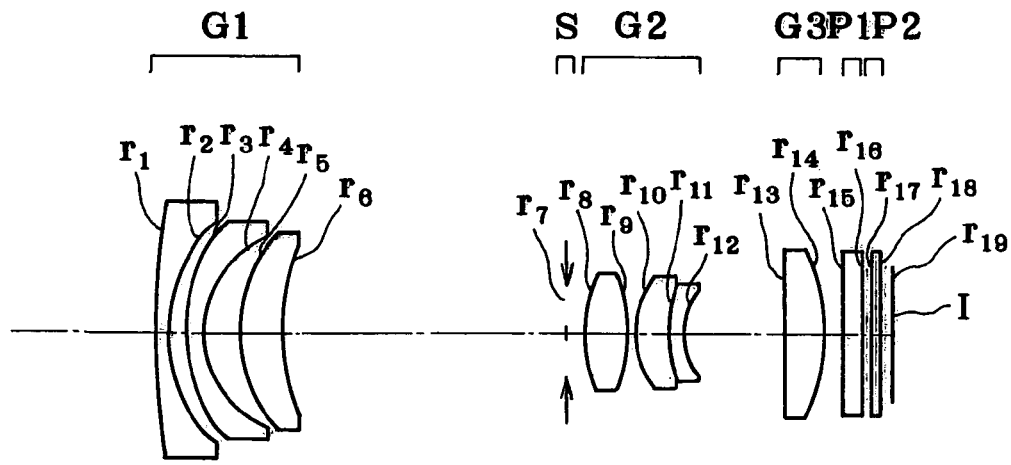
Figure 4B:
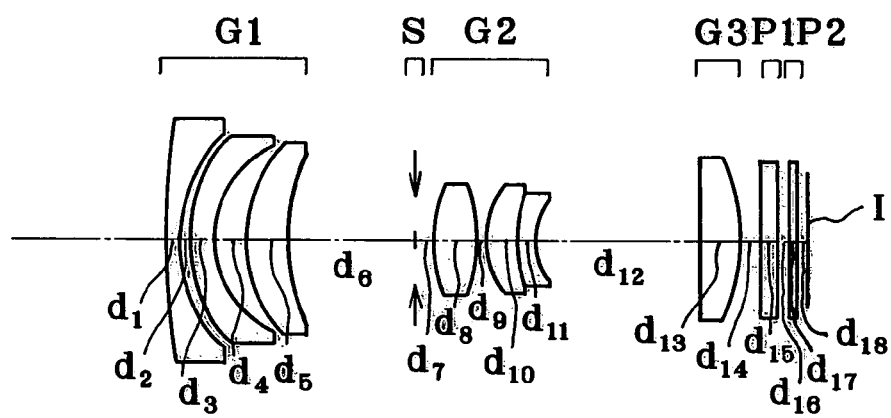
Figure 4C:
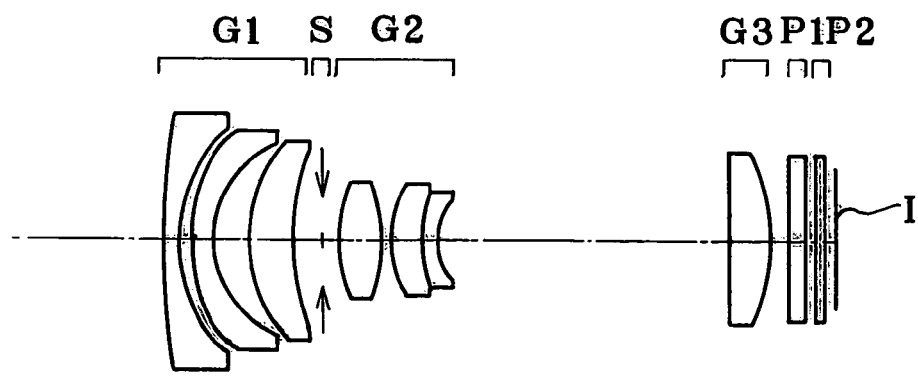

As shown in FIG. 4, the zoom lens system according to this example is made up of, in order from its object side, a negative first lens group G1, an aperture stop S, a positive second lens group G2 and a positive third lens group G3. From the wide-angle end to the telephoto end via an intermediate focal length during focused at infinity, the respective lens groups move as follows. On the way to the image side, the first lens group G1 comes back toward the object side, traveling in such a convex orbit that it is located nearer to the image side at the telephoto end than at the wide-angle end; the second lens group G2 moves monotonously toward the object side together with an object side-aperture stop S; and the third lens group G3 stays fixed.

The first lens group G1 consists of three lenses, say, a negative meniscus lens convex on its object side, a negative meniscus lens convex on its object side with aspheric surfaces used both its sides and a positive meniscus lens convex on its object side, and the second lens group G2 consists of two subgroups or three lenses, say, a double-convex positive lens with an aspheric surface used at the object side-surface thereof, and a cemented lens consisting of a positive meniscus lens convex on its object side and a negative meniscus lens convex on its object side. The third lens group G3 consists of one double-convex positive lens convex with an aspheric surface used at the object side-surface thereof.

EXAMPLE 5

Figure 5A:
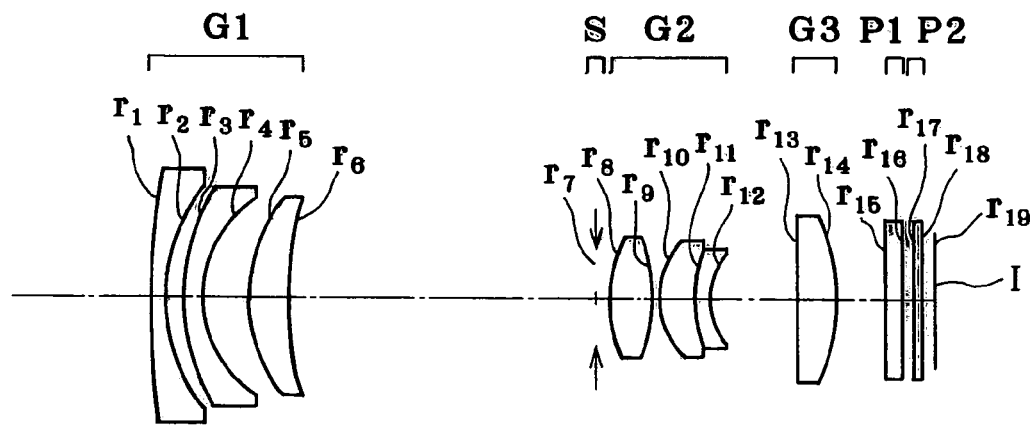
Figure 5B:
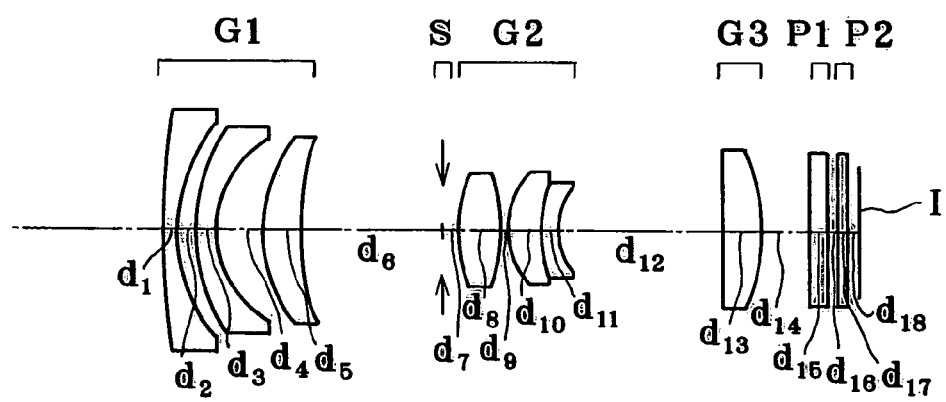
Figure 5C:
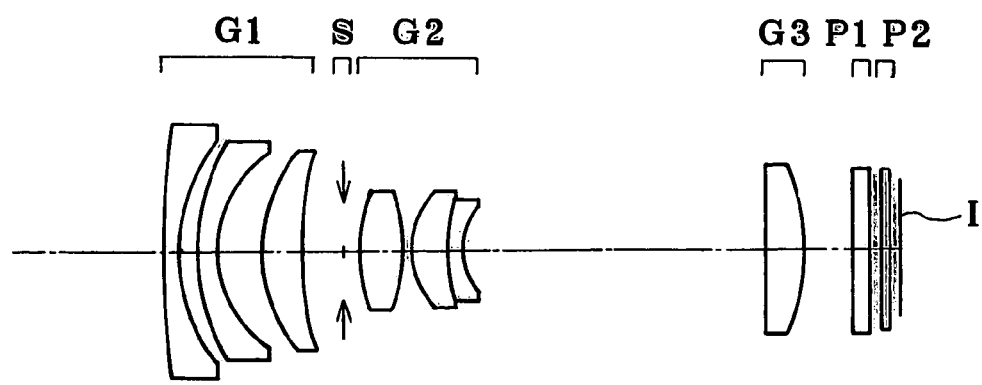
Figure 6A:
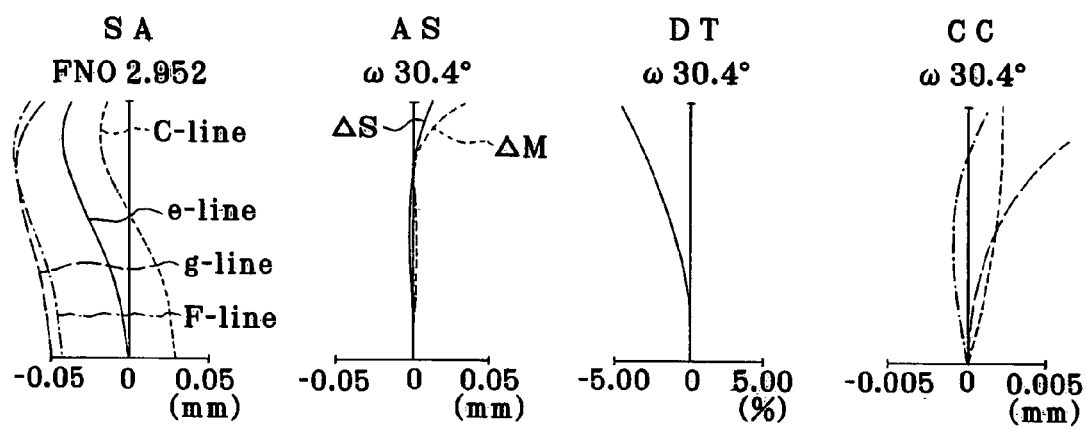
Figure 6B:
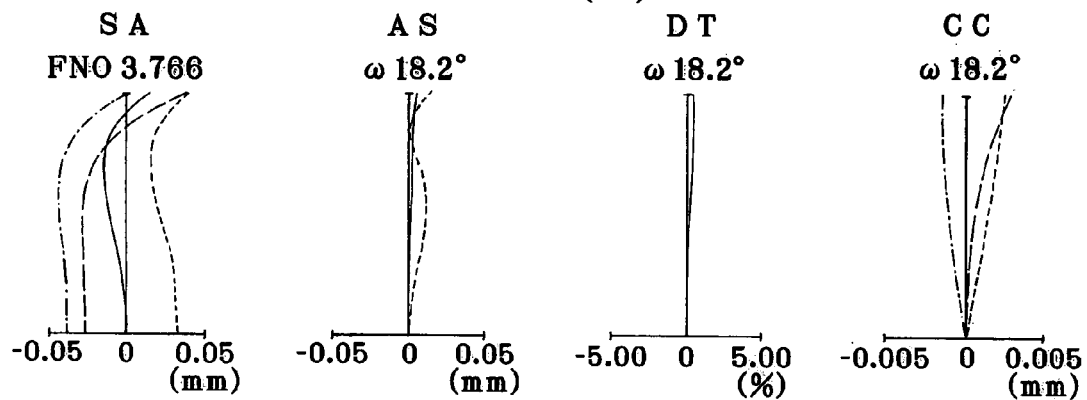
Figure 6C:
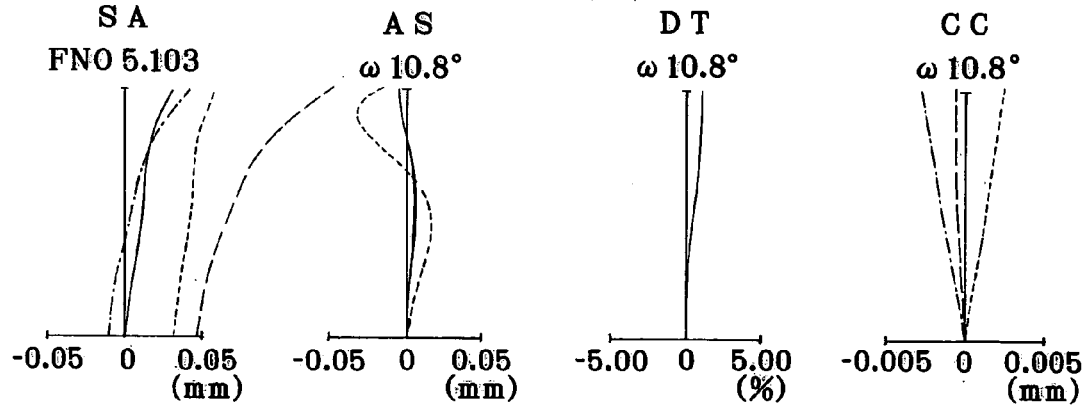
Figure 7A:
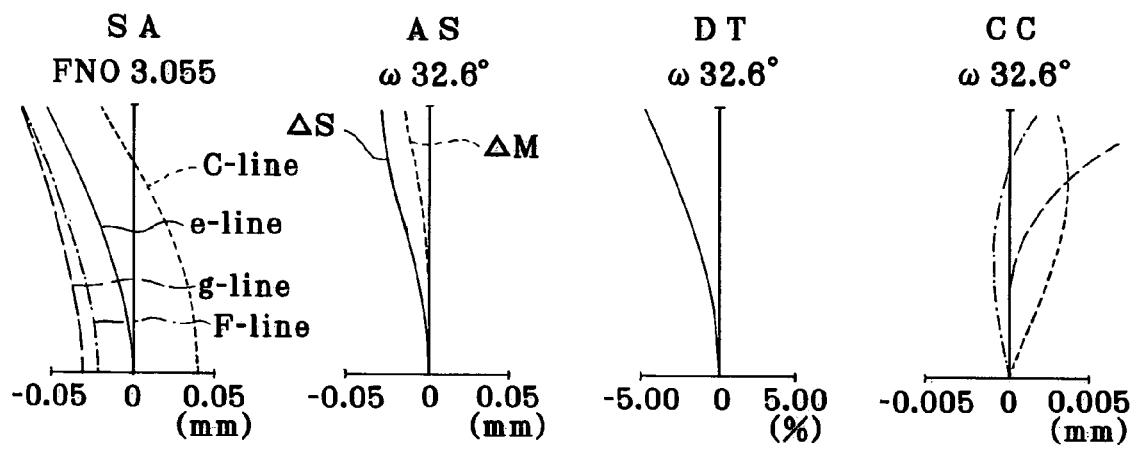
Figure 7B:
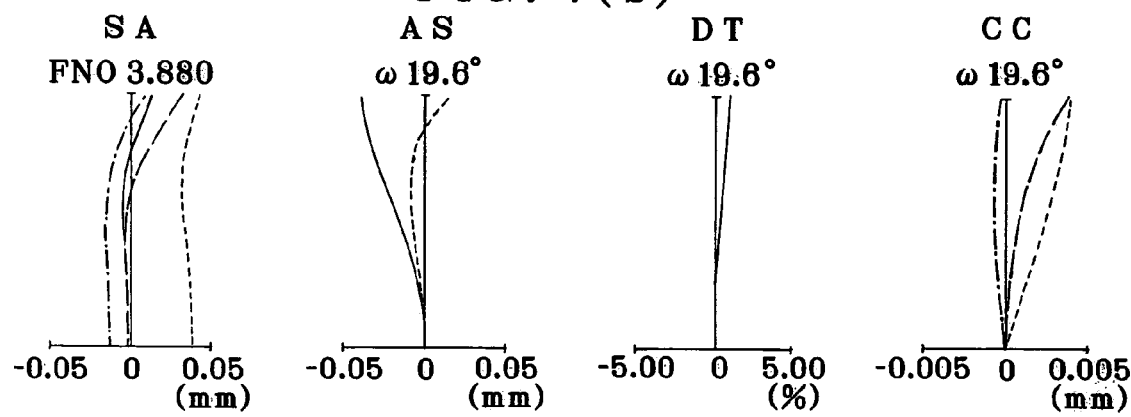
Figure 7C:
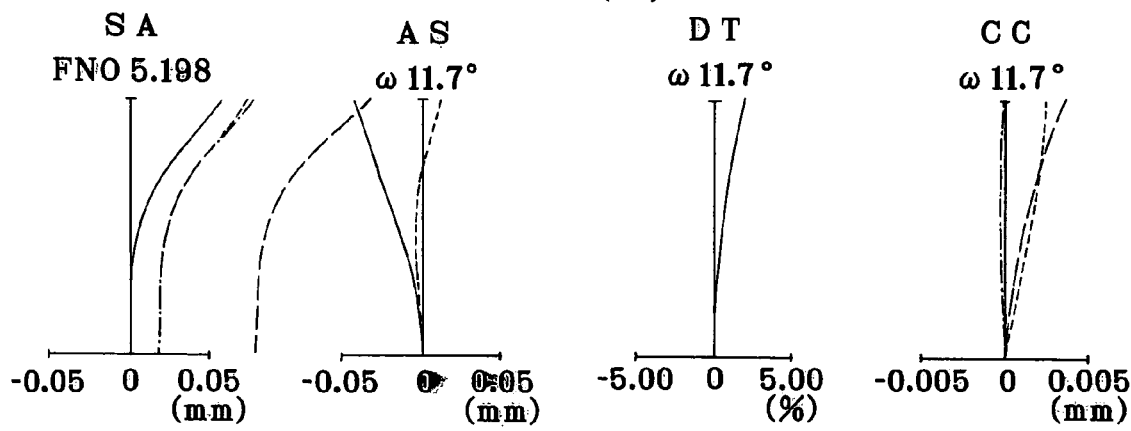
Figure 8A:
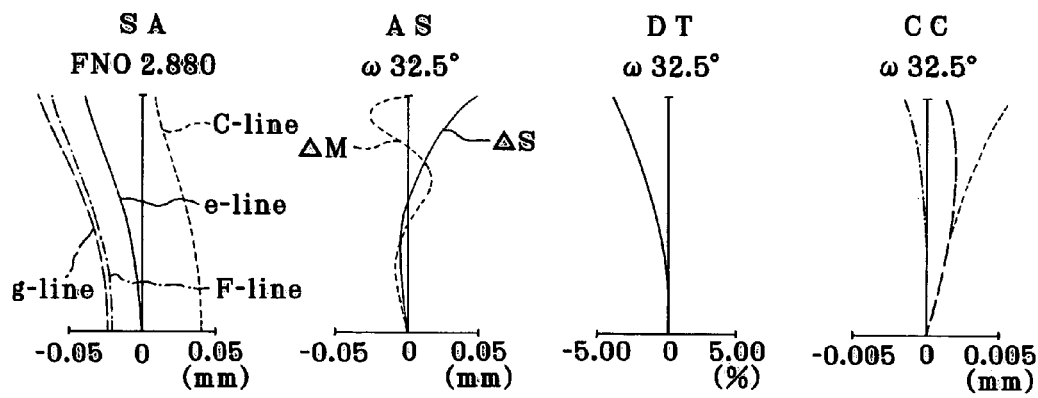
Figure 8B:
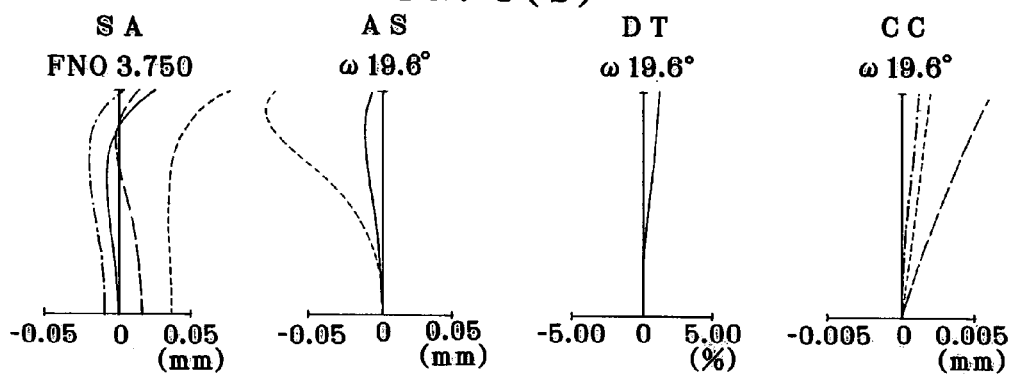
Figure 8C:
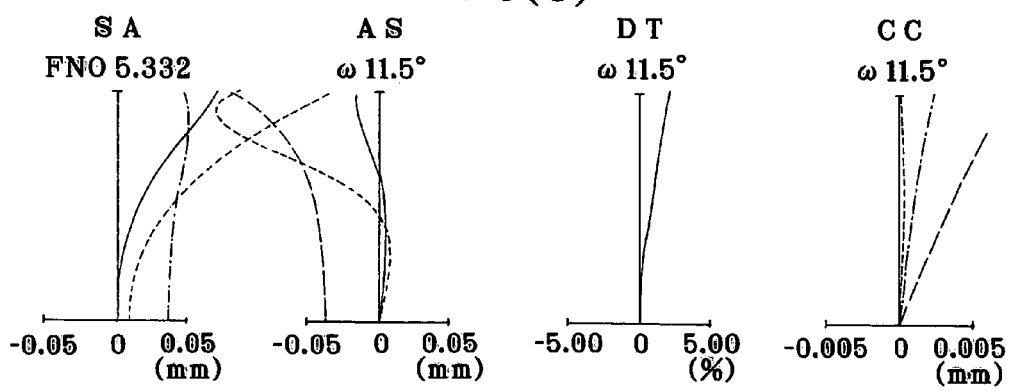
Figure 9A:
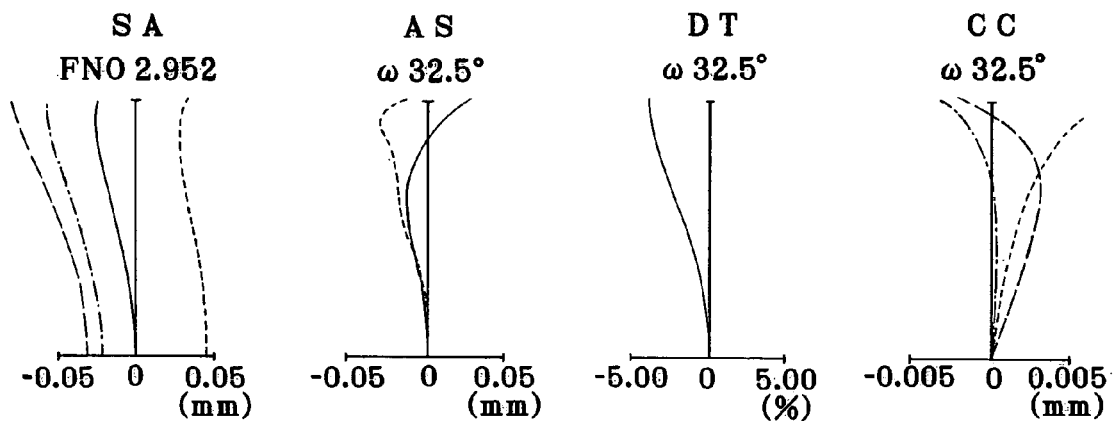
Figure 9B:
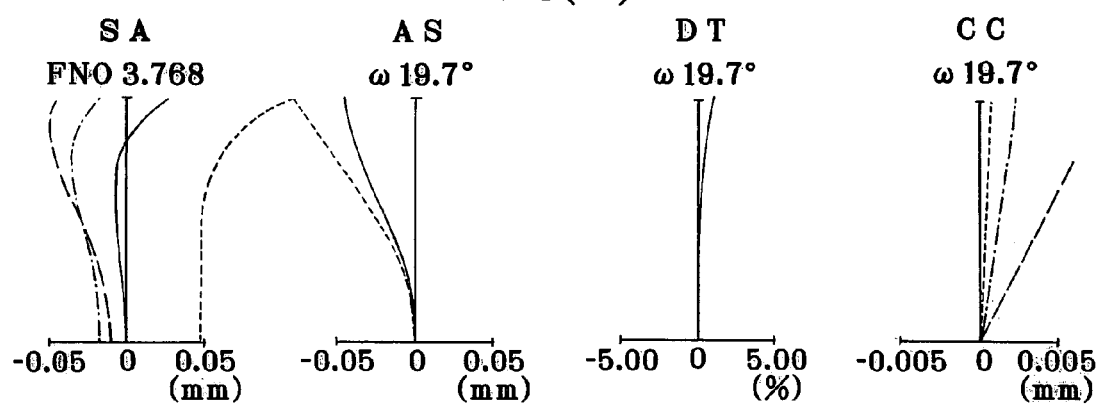
Figure 9C:
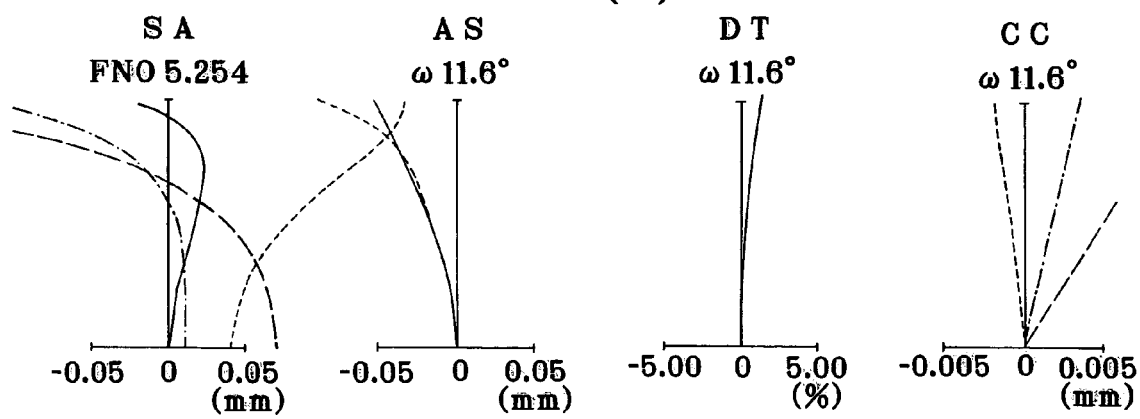
Figure 10A:
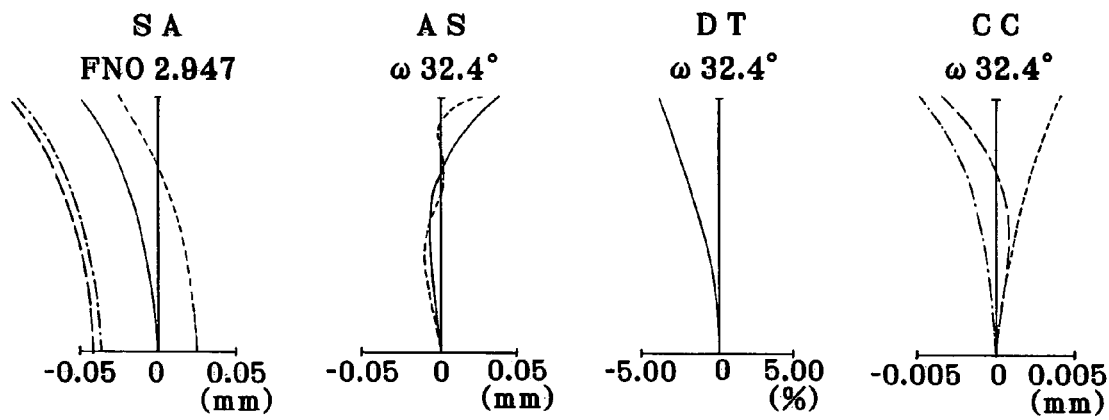
Figure 10B:
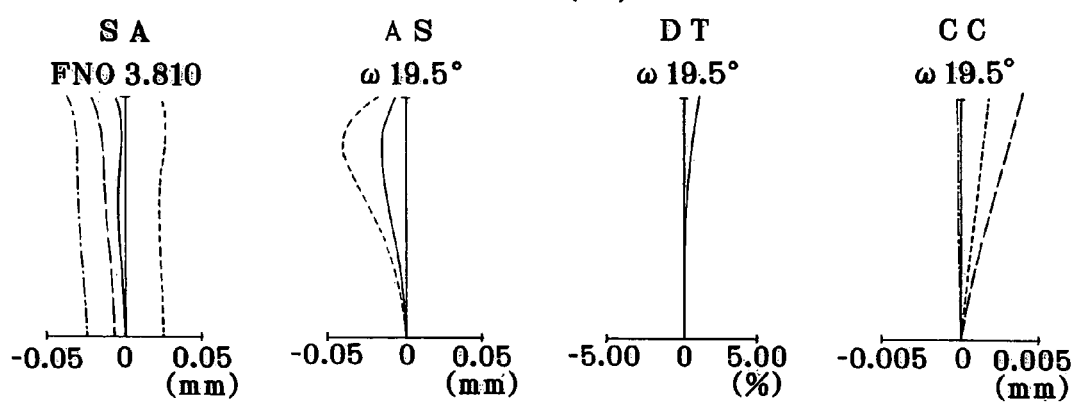
Figure 10C:
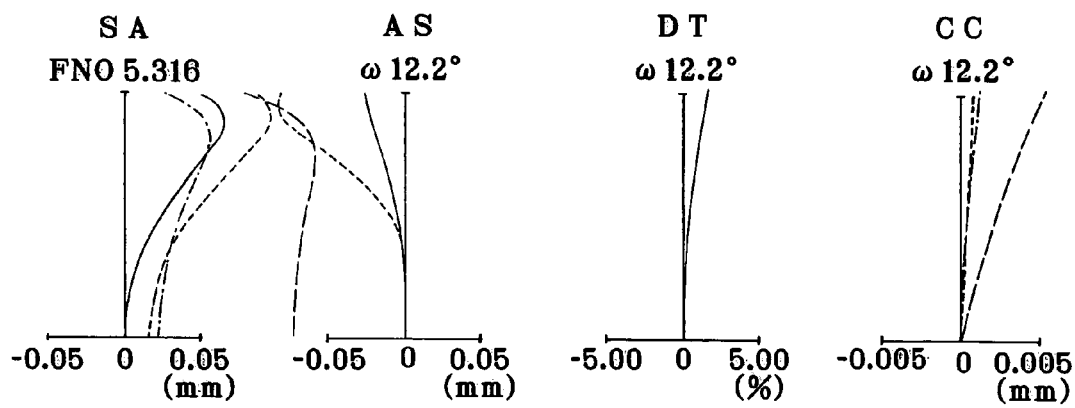

As shown in FIG. 5, the zoom lens system according to this example is made up of, in order from its object side, a negative first lens group G1, an aperture stop S, a positive second lens group G2 and a positive third lens group G3. From the wide-angle end to the telephoto end via an intermediate focal length during focused at infinity, the respective lens groups move as follows. On the way to the image side, the first lens group G1 comes back toward the object side, traveling in such a convex orbit that it is located nearer to the image side at the telephoto end than at the wide-angle end; the second lens group G2 moves monotonously toward the object side together with an object side-aperture stop S; and the third lens group G3 stays fixed.

The first lens group G1 consists of three lenses, say, a negative meniscus lens convex on its object side, a negative meniscus lens convex on its object side, with an aspheric surface used at the image side-surface thereof, and a positive meniscus lens convex on its object side, and the second lens group G2 consists of two subgroups or three lenses, say, a double-convex positive lens with an aspheric surface used at the object side-surface thereof, and a cemented lens consisting of a positive meniscus lens convex on its object side and a negative meniscus lens convex on its object side. The third lens group G3 consists of one double-convex positive lens, with an aspheric surface used at the object side-surface thereof.

Throughout Examples 3–5, focusing on near distances is carried out by movement of the third lens group G3 in an axial direction; however, this could be achieved in any desired mode, for instance, by movement of the first lens group G1 or the whole zoom lens system.

The numerical data on each example are given below. Symbols used hereinafter but not hereinbefore have the following meanings:

f: focal length of the zoom lens system,
2ω: angle of view,
$F_{NO}$: F-number,
WE: wide-angle end,
ST: intermediate state,
TE: telephoto end,
$r_1, r_2, \ldots$ : radius of curvature of each lens surface,
$d_1, d_2, \ldots$ : spacing between adjacent lens surfaces,
$n_{d1}, n_{d2}, \ldots$ : d-line refractive index of each lens, and
$\nu_{d1}, \nu_{d2}, \ldots$ : Abbe number of each lens.

Here let x be an optical axis on condition that the direction of propagation of light is positive and y be a direction orthogonal to the optical axis. Then, aspheric configuration is given by $$x=(y^2/r)/[1+\{1-(K+1)(y/r)^2\}^{1/2}]+A_4y^4+A_6y^6+A_8y^8+A_{10}y^{10}$$

where r is an axial radius of curvature, K is a conical coefficient, and $A_4$, $A_6$, $A_8$ and $A_{10}$ are the fourth, sixth, eighth and tenth aspheric coefficients, respectively.

EXAMPLE 1

| | | | |
|---|---|---|---|
| $r_1 = 21.592$ | $d_1 = 1.00$ | $n_{d1} = 1.8044$ | $\nu_{d1} = 39.59$ |
| $r_2 = 7.204$ | $d_2 = 2.70$ | | |
| $r_3 = -60.57$ | $d_3 = 0.95$ | $n_{d2} = 1.741$ | $\nu_{d2} = 52.64$ |
| $r_4 = 18.46$ | $d_4 = 0.15$ | | |
| $r_5 = 11.096$ | $d_5 = 2.56$ | $n_{d3} = 1.76182$ | $\nu_{d3} = 26.52$ |
| $r_6 = 74.31$ | $d_6 = $ (Variable) | | |
| $r_7 = \infty$ (Stop) | $d_7 = 0.65$ | | |
| $r_8 = 16.5505$ (Aspheric) | $d_8 = 2.99$ | $n_{d4} = 1.58313$ | $\nu_{d4} = 59.46$ |
| $r_9 = -13.6253$ (Aspheric) | $d_9 = 0.15$ | | |
| $r_{10} = 6.991$ | $d_{10} = 2.81$ | $n_{d5} = 1.7859$ | $\nu_{d5} = 44.2$ |
| $r_{11} = -10.484$ | $d_{11} = 0.80$ | $n_{d6} = 1.71736$ | $\nu_{d6} = 29.52$ |
| $r_{12} = 3.968$ | $d_{12} = $ (Variable) | | |
| $r_{13} = -124.776$ | $d_{13} = 2.19$ | $n_{d7} = 1.52542$ | $\nu_{d7} = 55.78$ |
| $r_{14} = -9.2341$ (Aspheric) | $d_{14} = $ (Variable) | | |
| $r_{15} = \infty$ | $d_{15} = 0.79$ | $n_{d8} = 1.54771$ | $\nu_{d8} = 62.84$ |
| $r_{16} = \infty$ | $d_{16} = 0.78$ | | |
| $r_{17} = \infty$ | $d_{17} = 0.50$ | $n_{d9} = 1.51633$ | $\nu_{d9} = 64.14$ |
| $r_{18} = \infty$ | $d_{18} = 0.80$ | | |
| $r_{19} = \infty$ (Image plane) | | | |

| Aspherical Coefficients |
|---|
| 8th surface |
| K = 7 |
| $A_4 = -6.91 \times 10^{-4}$ |
| $A_6 = -2.17 \times 10^{-5}$ |
| $A_8 = -1.16 \times 10^{-6}$ |
| $A_{10} = 0$ |
| 9th surface |
| K = -1.1993 |
| $A_4 = -3.21 \times 10^{-4}$ |
| $A_6 = -1.74 \times 10^{-5}$ |
| $A_8 = -5.19 \times 10^{-7}$ |
| $A_{10} = 0$ |

-continued

14th surface

K = 0
$A_4 = 4.17 \times 10^{-4}$
$A_6 = -1.20 \times 10^{-5}$
$A_8 = 3.33 \times 10^{-7}$
$A_{10} = 0$ Zooming Data (∞)

|  | WE | ST | TE |
|---|---|---|---|
| f (mm) | 5.96 | 10.11 | 17.20 |
| $F_{NO}$ | 2.95 | 3.77 | 5.12 |
| 2ω (°) | 60.8 | 36.3 | 21.6 |
| $d_6$ | 17.21 | 7.82 | 1.99 |
| $d_{12}$ | 4.16 | 8.62 | 15.98 |
| $d_{14}$ | 2.97 | 3.01 | 3.51 |

EXAMPLE 2

| | | | |
|---|---|---|---|
| $r_1 = 15.8143$ | $d_1 = 1.00$ | $n_{d1} = 1.83932$ | $\nu_{d1} = 37.16$ |
| $r_2 = 7.2147$ | $d_2 = 2.90$ | | |
| $r_3 = -1207.1502$ | $d_3 = 0.97$ | $n_{d2} = 1.73234$ | $\nu_{d2} = 54.68$ |
| $r_4 = 13.2825$ | $d_4 = 0.50$ | | |
| $r_5 = 9.9545$ | $d_5 = 2.00$ | $n_{d3} = 1.79173$ | $\nu_{d3} = 26.29$ |
| $r_6 = 27.4165$ | $d_6 =$ (Variable) | | |
| $r_7 = \infty$ (Stop) | $d_7 = 0.80$ | | |
| $r_8 = 9.8326$ (Aspheric) | $d_8 = 3.60$ | $n_{d4} = 1.58547$ | $\nu_{d4} = 59.38$ |
| $r_9 = -13.1652$ | $d_9 = 0.51$ | | |
| $r_{10} = 11.9431$ | $d_{10} = 2.60$ | $n_{d5} = 1.79196$ | $\nu_{d5} = 47.37$ |
| $r_{11} = -6.6465$ | $d_{11} = 0.80$ | $n_{d6} = 1.67765$ | $\nu_{d6} = 32.1$ |
| $r_{12} = 4.5793$ | $d_{12} =$ (Variable) | | |
| $r_{13} = -39.0527$ | $d_{13} = 2.20$ | $n_{d7} = 1.5277$ | $\nu_{d7} = 55.78$ |
| $r_{14} = -7.9487$ (Aspheric) | $d_{14} =$ (Variable) | | |
| $r_{15} = \infty$ | $d_{15} = 0.96$ | $n_{d8} = 1.54979$ | $\nu_{d8} = 62.84$ |
| $r_{16} = \infty$ | $d_{16} = 0.60$ | | |
| $r_{17} = \infty$ | $d_{17} = 0.50$ | $n_{d9} = 1.51825$ | $\nu_{d9} = 64.14$ |
| $r_{18} = \infty$ | $d_{18} = 0.70$ | | |
| $r_{19} = \infty$ (Image plane) | | | |

Aspherical Coefficients

8th surface

K = −7
$A_4 = 3.68 \times 10^{-4}$
$A_6 = -2.89 \times 10^{-5}$
$A_8 = 7.08 \times 10^{-7}$
$A_{10} = 0$ 14th surface K = 0
$A_4 = 5.15 \times 10^{-4}$
$A_6 = -3.11 \times 10^{-6}$
$A_8 = 4.04 \times 10^{-8}$
$A_{10} = 0$ Zooming Data (∞)

|  | WE | ST | TE |
|---|---|---|---|
| f (mm) | 5.46 | 9.28 | 15.80 |
| $F_{NO}$ | 3.06 | 3.88 | 5.20 |
| 2ω (°) | 65.2 | 39.1 | 23.3 |
| $d_6$ | 18.14 | 8.47 | 2.35 |
| $d_{12}$ | 2.79 | 7.06 | 13.50 |
| $d_{14}$ | 3.11 | 2.84 | 3.00 |

EXAMPLE 3

| | | | |
|---|---|---|---|
| $r_1 = 32.3577$ | $d_1 = 0.80$ | $n_{d1} = 1.81078$ | $\nu_{d1} = 40.92$ |
| $r_2 = 7.5927$ | $d_2 = 1.37$ | | |
| $r_3 = 11.4778$ | $d_3 = 1.00$ | $n_{d2} = 1.5112$ | $\nu_{d2} = 55.88$ |
| $r_4 = 5.4500$ (Aspheric) | $d_4 = 1.99$ | | |
| $r_5 = 8.729$ | $d_5 = 2.06$ | $n_{d3} = 1.79173$ | $\nu_{d3} = 26.29$ |
| $r_6 = 16.7082$ | $d_6 =$ (Variable) | | |
| $r_7 = \infty$ (Stop) | $d_7 = 0.80$ | | |
| $r_8 = 9.3478$ (Aspheric) | $d_8 = 2.44$ | $n_{d4} = 1.5112$ | $\nu_{d4} = 55.88$ |
| $r_9 = -10.8226$ | $d_9 = 0.20$ | | |
| $r_{10} = 4.4874$ | $d_{10} = 2.05$ | $n_{d5} = 1.48915$ | $\nu_{d5} = 70.23$ |
| $r_{11} = 9.7367$ | $d_{11} = 0.80$ | $n_{d6} = 1.85504$ | $\nu_{d6} = 23.78$ |
| $r_{12} = 3.5568$ | $d_{12} =$ (Variable) | | |
| $r_{13} = 107.9537$ (Aspheric) | $d_{13} = 2.07$ | $n_{d7} = 1.5112$ | $\nu_{d7} = 55.88$ |
| $r_{14} = -12.1492$ | $d_{14} = 2.36$ | | |
| $r_{15} = \infty$ | $d_{15} = 0.96$ | $n_{d8} = 1.54979$ | $\nu_{d8} = 62.84$ |
| $r_{16} = \infty$ | $d_{16} = 0.6$ | | |
| $r_{17} = \infty$ | $d_{17} = 0.5$ | $n_{d9} = 1.51825$ | $\nu_{d9} = 64.14$ |
| $r_{18} = \infty$ | $d_{18} = 0.59$ | | |
| $r_{19} = \infty$ (Image plane) | | | |

Aspherical Coefficients

4th surface

K = −0.072
$A_4 = -5.26 \times 10^{-4}$
$A_6 = -1.33 \times 10^{-6}$
$A_8 = -7.94 \times 10^{-7}$
$A_{10} = 0$ 8th surface K = −2.3238
$A_4 = -1.81 \times 10^{-4}$
$A_6 = -3.30 \times 10^{-6}$
$A_8 = -2.09 \times 10^{-8}$
$A_{10} = 0$ 13th surface K = −5.0585
$A_4 = -3.94 \times 10^{-4}$
$A_6 = 1.48 \times 10^{-5}$
$A_8 = -4.50 \times 10^{-7}$
$A_{10} = 0$ Zooming Data (∞)

|  | WE | ST | TE |
|---|---|---|---|
| f (mm) | 5.90 | 10.00 | 17.40 |
| $F_{NO}$ | 2.88 | 3.75 | 5.33 |
| 2ω (°) | 64.9 | 39.2 | 22.9 |
| $d_6$ | 14.78 | 7.04 | 2.30 |
| $d_{12}$ | 4.96 | 9.41 | 17.39 |

EXAMPLE 4

| | | | |
|---|---|---|---|
| $r_1 = 39.1644$ | $d_1 = 0.80$ | $n_{d1} = 1.80642$ | $\nu_{d1} = 34.97$ |
| $r_2 = 8.0692$ | $d_2 = 0.70$ | | |
| $r_3 = 13.5781$ (Aspheric) | $d_3 = 1.00$ | $n_{d2} = 1.5112$ | $\nu_{d2} = 55.88$ |
| $r_4 = 5.7958$ (Aspheric) | $d_4 = 1.74$ | | |
| $r_5 = 7.416$ | $d_5 = 2.40$ | $n_{d3} = 1.81264$ | $\nu_{d3} = 25.42$ |
| $r_6 = 13.1873$ | $d_6 =$ (Variable) | | |
| $r_7 = \infty$ (Stop) | $d_7 = 0.80$ | | |
| $r_8 = 7.6494$ (Aspheric) | $d_8 = 2.48$ | $n_{d4} = 1.52033$ | $\nu_{d4} = 58.9$ |

-continued

| | | | |
|---|---|---|---|
| $r_9 = -10.897$ | $d_9 = 0.20$ | | |
| $r_{10} = 4.8124$ | $d_{10} = 1.88$ | $n_{d5} = 1.48915$ | $\nu_{d5} = 70.23$ |
| $r_{11} = 9.0693$ | $d_{11} = 0.80$ | $n_{d6} = 1.85504$ | $\nu_{d6} = 23.78$ |
| $r_{12} = 3.5314$ | $d_{12}$ = (Variable) | | |
| $r_{13} = 102.0425$ (Aspheric) | $d_{13} = 2.16$ | $n_{d7} = 1.5112$ | $\nu_{d7} = 55.88$ |
| $r_{14} = -10.8957$ | $d_{14} = 1.10$ | | |
| $r_{15} = \infty$ | $d_{15} = 0.96$ | $n_{d8} = 1.54979$ | $\nu_{d8} = 62.84$ |
| $r_{16} = \infty$ | $d_{16} = 0.60$ | | |
| $r_{17} = \infty$ | $d_{17} = 0.50$ | $n_{d9} = 1.51825$ | $\nu_{d9} = 64.14$ |
| $r_{18} = \infty$ | $d_{18} = 0.58$ | | |
| $r_{19} = \infty$ (Image plane) | | | |

Aspherical Coefficients

3rd surface $K = 0$
$A_4 = 1.13 \times 10^{-3}$
$A_6 = -2.41 \times 10^{-5}$
$A_8 = 4.62 \times 10^{-7}$
$A_{10} = 0$ 4th surface $K = 0$
$A_4 = 1.08 \times 10^{-3}$
$A_6 = -2.80 \times 10^{-5}$
$A_8 = 2.45 \times 10^{-7}$
$A_{10} = 0$ 8th surface $K = -2.3651$
$A_4 = -1.18 \times 10^{-5}$
$A_6 = -9.11 \times 10^{-6}$
$A_8 = -2.32 \times 10^{-9}$
$A_{10} = 0$ 13th surface $K = 0$
$A_4 = -2.80 \times 10^{-4}$
$A_6 = -2.14 \times 10^{-6}$
$A_8 = 1.88 \times 10^{-7}$
$A_{10} = 0$ Zooming Data (∞)

| | WE | ST | TE |
|---|---|---|---|
| f (mm) | 5.90 | 10.00 | 17.40 |
| $F_{NO}$ | 2.95 | 3.77 | 5.25 |
| 2ω (°) | 64.9 | 39.3 | 23.1 |
| $d_6$ | 15.13 | 6.78 | 1.67 |
| $d_{12}$ | 5.07 | 8.66 | 15.13 |

EXAMPLE 5

| | | | |
|---|---|---|---|
| $r_1 = 49.156$ | $d_1 = 0.80$ | $n_{d1} = 1.8061$ | $\nu_{d1} = 40.92$ |
| $r_2 = 9.535$ | $d_2 = 1.02$ | | |
| $r_3 = 11.568$ | $d_3 = 1.00$ | $n_{d2} = 1.50903$ | $\nu_{d2} = 55.88$ |
| $r_4 = 5.4955$ (Aspheric) | $d_4 = 2.41$ | | |
| $r_5 = 9.374$ | $d_5 = 2.09$ | $n_{d3} = 1.7847$ | $\nu_{d3} = 26.29$ |
| $r_6 = 17.352$ | $d_6$ = (Variable) | | |
| $r_7 = \infty$ (Stop) | $d_7 = 0.80$ | | |
| $r_8 = 9.7713$ (Aspheric) | $d_8 = 2.39$ | $n_{d4} = 1.50903$ | $\nu_{d4} = 55.88$ |
| $r_9 = -11.63$ | $d_9 = 0.20$ | | |
| $r_{10} = 4.376$ | $d_{10} = 2.04$ | $n_{d5} = 1.48749$ | $\nu_{d5} = 70.23$ |
| $r_{11} = 8.807$ | $d_{11} = 0.80$ | $n_{d6} = 1.84666$ | $\nu_{d6} = 23.78$ |
| $r_{12} = 3.473$ | $d_{12}$ = (Variable) | | |
| $r_{13} = 113.0388$ (Aspheric) | $d_{13} = 2.1$ | $n_{d7} = 1.50903$ | $\nu_{d7} = 55.88$ |
| $r_{14} = -11.568$ | $d_{14} = 2.58$ | | |

-continued

| | | | |
|---|---|---|---|
| $r_{15} = \infty$ | $d_{15} = 0.96$ | $n_{d8} = 1.54771$ | $\nu_{d8} = 62.84$ |
| $r_{16} = \infty$ | $d_{16} = 0.60$ | | |
| $r_{17} = \infty$ | $d_{17} = 0.50$ | $n_{d9} = 1.51633$ | $\nu_{d9} = 64.14$ |
| $r_{18} = \infty$ | $d_{18} = 0.60$ | | |
| $r_{19} = \infty$ (Image plane) | | | |

Aspherical Coefficients

4th surface $K = -0.3493$
$A_4 = -2.32 \times 10^{-4}$
$A_6 = -6.88 \times 10^{-7}$
$A_8 = -2.23 \times 10^{-7}$
$A_{10} = 0$ 8th surface $K = -5.3144$
$A_4 = 2.40 \times 10^{-4}$
$A_6 = -1.49 \times 10^{-5}$
$A_8 = 3.16 \times 10^{-7}$
$A_{10} = 0$ 13th surface $K = -5.0585$
$A_4 = -2.99 \times 10^{-4}$
$A_6 = 6.48 \times 10^{-6}$
$A_8 = -1.67 \times 10^{-7}$
$A_{10} = 0$ Zooming Data (∞)

| | WE | ST | TE |
|---|---|---|---|
| f (mm) | 5.91 | 10.11 | 17.40 |
| $F_{NO}$ | 2.95 | 3.81 | 5.32 |
| 2ω (°) | 64.8 | 38.9 | 24.3 |
| $d_6$ | 16.74 | 7.65 | 2.30 |
| $d_{12}$ | 4.67 | 9.03 | 16.58 |

FIGS. 6–10 are aberration diagrams for Examples 1–5 upon focused on an object point at infinity. In these aberration diagrams, (a), (b) and (c) are indicative of spherical aberrations (SA), coma (AS), distortion (DT) and chromatic aberration of magnification (CC) at the wide-angle end, in the intermediate state and at the telephoto end, respectively.

Tabulated below are the values for conditions (1) to (7) in Examples 1 and 2.

| | Example 1 | Example 2 |
|---|---|---|
| (1) | 0.862 | 0.661 |
| (2) | 0.453 | 0.51 |
| (3) | 1.528 | 1.528 |
| (4) | 0.90 | 0.79 |
| (5) | 1.877 | 1.02 |
| (6) | 3.5 | 3.7 |
| (7) | 0.006 | 0.022 |

The values for conditions (11), (12), (13-1), (13-2), (14) and (15) in Examples 3–5 are also tabulated below.

| | Example 3 | Example 4 | Example 5 |
|---|---|---|---|
| (11) | 70.23 | 70.23 | 70.23 |
| (12) | 46.45 | 46.45 | 46.45 |
| (13-1) | 1.5112 | 1.5112 | 1.50903 |
| (13-2) | 1.5112 | 1.5112 | 1.50903 |
| (14) | 0.356 | 0.402 | 0.356 |
| (15) | 1.254 | 1.239 | 1.228 |

The present imaging system constructed as described above may be applied to phototaking systems where object images formed through image-formation optical systems are received at image pickup devices such as CCDs, especially, digital cameras or video cameras as well as PCs and telephone sets that are typical information processors, in particular, easy-to-carry cellular phones. Given below are some such embodiments.

Figure 11:
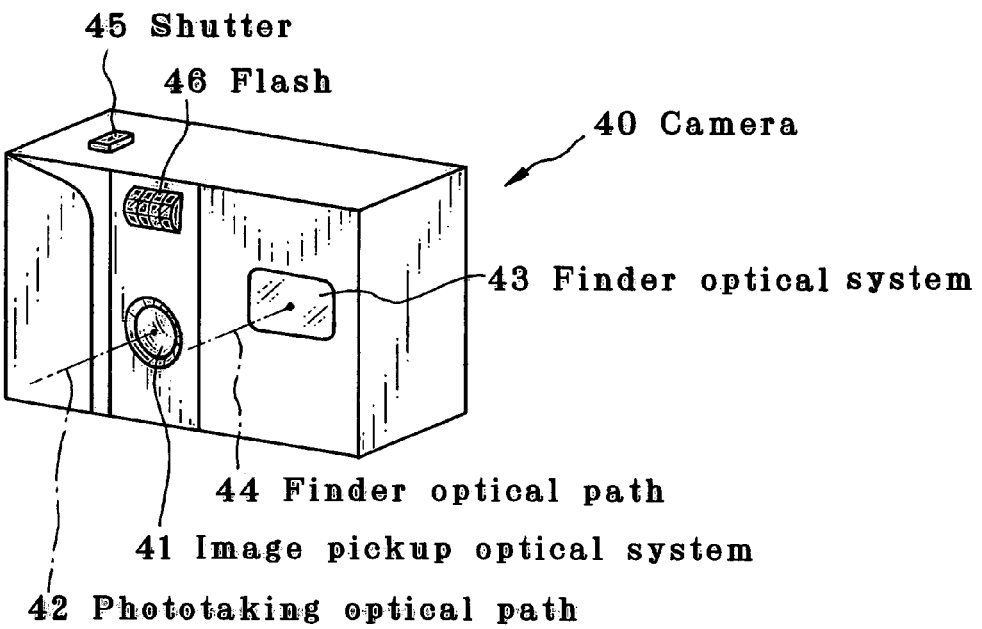
FIG. 11 is a front perspective view of the external appearance of a digital camera with the three-group zoom lens system of the invention built in it.
Figure 12:
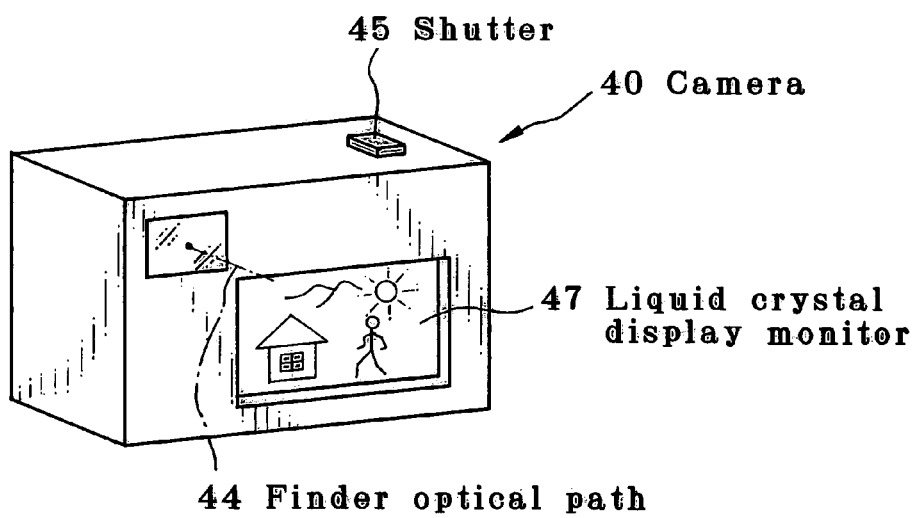
FIG. 12 is a rear perspective view of the digital camera of FIG. 11.
Figure 13:
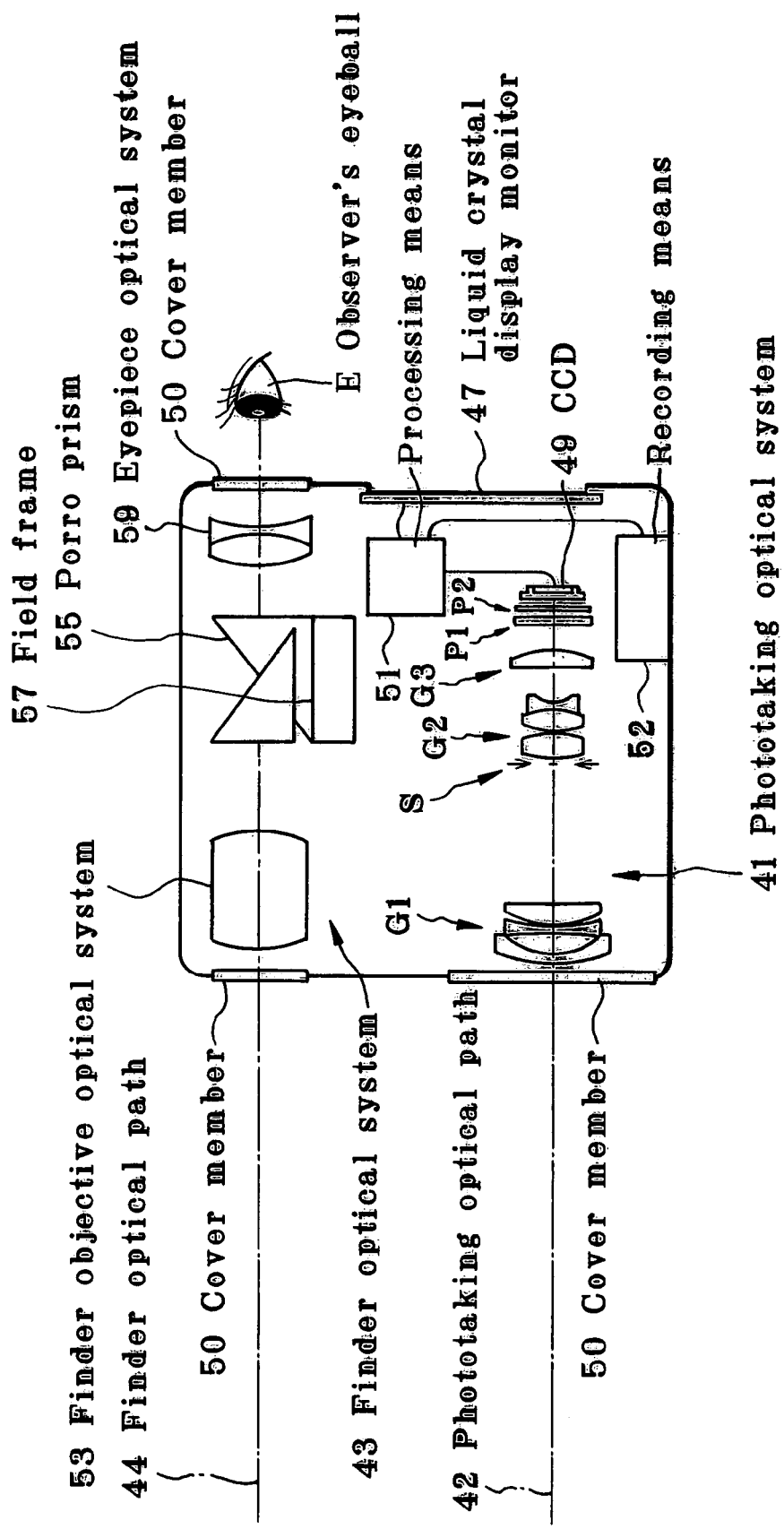
FIG. 13 is a sectional view of the digital camera of FIG. 11.

FIGS. 11, 12 and 13 are conceptual illustrations of a phototaking optical system 41 for digital cameras, in which the zoom lens system of the invention is incorporated. FIG. 11 is a front perspective view of the outward appearance of a digital camera 40, and FIG. 12 is a rear perspective view of the same. FIG. 13 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens system according to Example 1. An object image formed by the phototaking optical system 41 is formed on the image pickup plane of a CCD 49 via a plane-parallel plate P1 and a cover glass P2 each provided with a near ultraviolet cut coating and having a low-pass filter function. An object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and compactness, because the phototaking optical system 41 is of high performance and compactness.

In the embodiment of FIG. 13, plane-parallel plates are used as the cover members 50; however, it is acceptable to use powered lenses.

Figure 14:
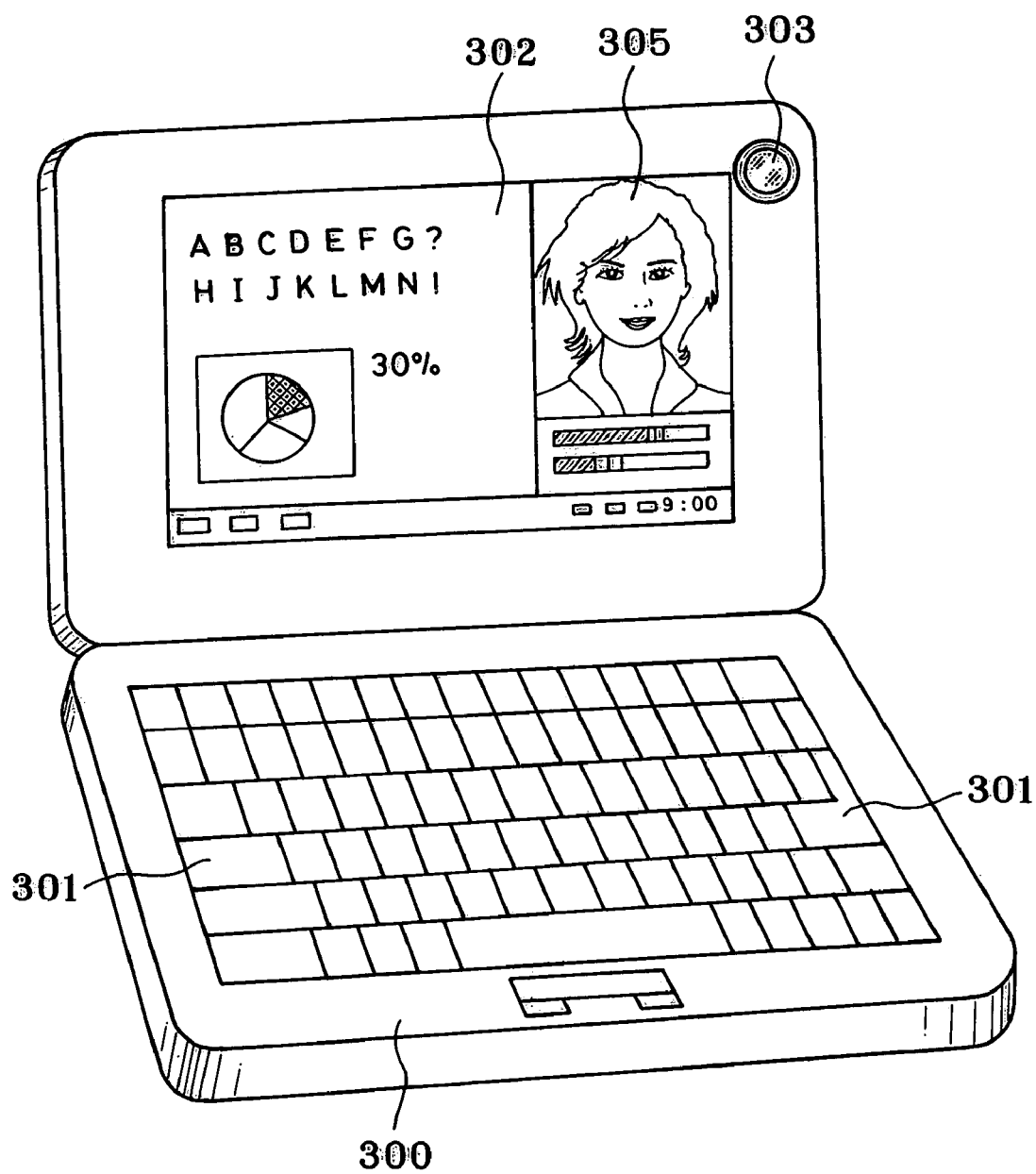
FIG. 14 is a front perspective view of an unfolded personal computer in which the three-group zoom lens system of the invention is incorporated as an objective optical system.
Figure 15:
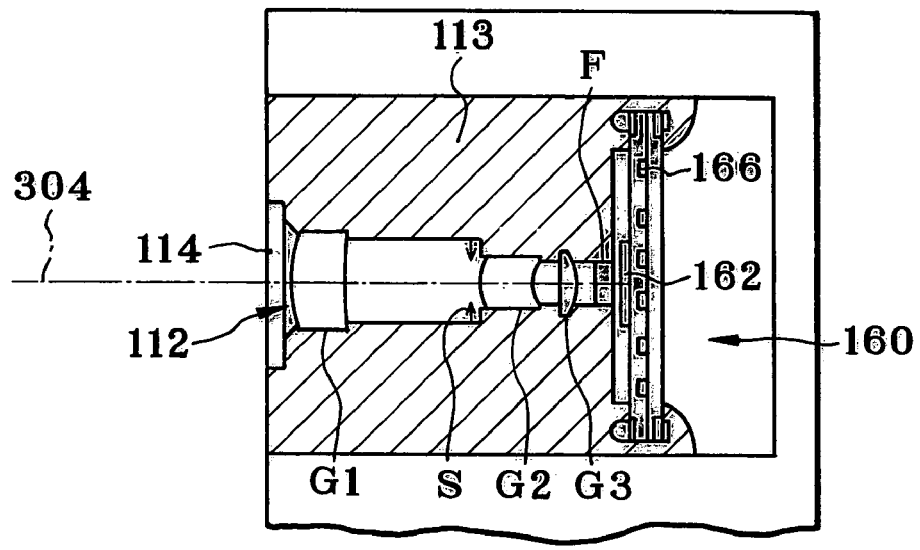
FIG. 15 is a sectional view of a phototaking optical system for the personal computer.
Figure 16:
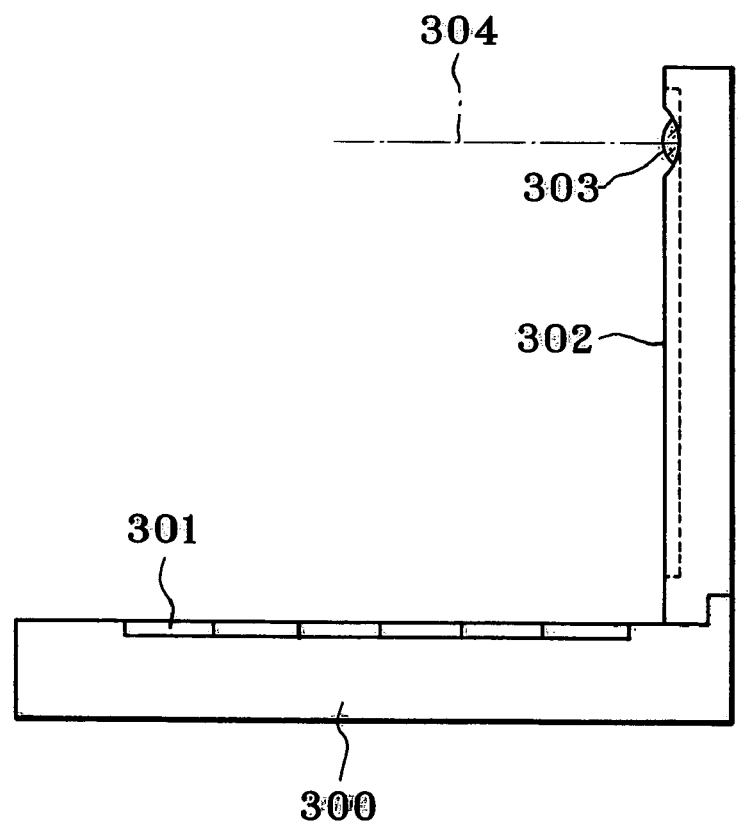
FIG. 16 is a side view of one specific state of FIG. 14.

FIGS. 14, 15 and 16 are illustrative of a personal computer that is one example of the information processor in which the zoom lens system of the invention is built in as an objective optical system. FIG. 14 is a front perspective view of a personal computer 300 in use, FIG. 15 is a sectional view of a phototaking optical system 303 in the personal computer 300, and FIG. 16 is a side view of the state of FIG. 15. As shown in FIGS. 14, 15 and 16, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the right-upper portion of the monitor 302, it may be located somewhere around the monitor 302 or keyboard 301.

This phototaking optical system 303 comprises, on a phototaking optical path 304, an objective lens 112 comprising the zoom lens system of the invention (roughly shown) and an image pickup device chip 162 for receiving an image. These are built in the personal computer 300.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112. It is noted that the driving mechanism for the zoom lens system in the lens barrel 113 is not shown.

An object image received at the image pickup device chip 162 is entered via a terminal 166 in the processing means of the personal computer 300, and shown as an electronic image on the monitor 302. As an example, an image 305 taken of the operator is shown in FIG. 14. This image 305 may be shown on a personal computer on the other end via suitable processing means and the Internet or telephone line.

FIGS. 17(*a*), 17(*b*) and 17(*c*) are illustrative of a telephone set that is one example of the information processor in which the zoom lens system of the invention is built in the form of a phototaking optical system, especially a convenient-to-carry cellular phone. FIG. 17(*a*) and FIG. 17(*b*) are a front view and a side view of a cellular phone 400, respectively, and FIG. 17(*c*) is a sectional view of a phototaking optical system 405. As shown in FIGS. 17(*a*), 17(*b*) and 17(*c*), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the image-formation optical system of the invention (roughly shown) and an image pickup device chip 162 for receiving an object image. These are built in the cellular phone 400.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112. It is noted that the driving mechanism for the zoom lens in the lens barrel 113 is not shown.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

What we claim is:

1. A zoom lens system, comprising, in order from an object side thereof, a first lens group that is located nearest to the object side and has negative refracting power, a second lens group of positive refracting power and a third lens group of positive refracting power, in which zooming is carried out by each movement of the first, the second, and the third lens group with a change in each space between adjacent lens groups, wherein:

said second lens group comprises three lenses inclusive of, in order from an object side thereof, a first lens of positive refracting power, a second lens of positive refracting power and a third lens of negative refracting power, and a total of the lenses in the second lens group is 3, and said third lens group comprises a positive lens that is of meniscus shape convex toward an image plane of the zoom lens system and satisfies the following condition (3-1), and a total of the lenses in the third lens group is 1:

$$1.44 < n \leq 1.53 \tag{3-1}$$

where n is a refractive index of the positive lens in the third lens group.

2. A zoom lens system, comprising, in order from an object side thereof, a first lens group that is located nearest to the object side and has negative refracting power, a second lens group of positive refracting power and a third lens group of positive refracting power, in which zooming is carried out by each movement of the first, the second, and the third lens group with a change in each space between adjacent lens groups, wherein:

said second lens group comprises three lenses inclusive of, in order from an object side thereof, a first lens of positive refracting power, a second lens of double-convex shape and positive refracting power and a third lens of double-concave shape and negative refracting power, and a total of the lenses in the second lens group is 3, wherein said second lens and said third lens are cemented together into a cemented lens, and said third lens group comprises a positive lens that is of meniscus shape convex toward an image plane of the zoom lens system, and a total of the lenses in the third lens group is 1, wherein said cemented lens satisfies the following conditions (A-1) and (B-1):

$$1.0 < r_{1c}/fw < 1.2 \tag{A-1}$$

$$-0.72 < r_{1c}/r_c < -0.40 \tag{B-1}$$

where $r_{1c}$ is an axial radius of curvature of an entrance surface of the cemented lens in the second lens group, $r_c$ is an axial radius of curvature of a cementing surface in the cemented lens in the second lens group, and $f_W$ is a focal length of the zoom lens system at a wide-angle end.

3. A zoom lens system, comprising, in order from an object side thereof, a first lens group that is located nearest to the object side and has negative refracting power, a second lens group of positive refracting power and a third lens group of positive refracting power, in which zooming is carried out by each movement of the first, the second, and the third lens group with a change in each space between adjacent lens groups, wherein:

said second lens group comprises three lenses inclusive of, in order from an object side thereof, a first lens of positive refracting power, a second lens of double-convex shape and positive refracting power and a third lens of double-concave shape and negative refracting power, and a total of the lenses in the second lens group is 3, wherein said second lens and said third lens are cemented together into a cemented lens, and said third lens group comprises a positive lens that is of meniscus shape convex toward an image plane of the zoom lens system, and a total of the lenses in the third lens group is 1, wherein said cemented lens satisfies the following conditions (A-2) and (B-2):

$$2.0 < r_{1c}/fw < 4.0 \tag{A-2}$$

$$-6.0 < r_{1c}/r_c < -1.6 \tag{B-2}$$

where $r_{1c}$ is an axial radius of curvature of an entrance surface of the cemented lens in the second lens group, $r_c$ is an axial radius of curvature of a cementing surface in the cemented lens in the second lens group, and $f_W$ is a focal length of the zoom lens system at a wide-angle end.

4. The zoom lens system according to claim 1 or 2, wherein an image side-surface of said positive lens in said third lens group is an aspheric surface.

5. The zoom lens system according to claim 1 or 2, wherein said positive lens in said third lens group satisfies the following condition (1):

$$0.4 < (R_1-R_2)/(R_1+R_2) < 0.89 \tag{1}$$

where $R_1$ is an axial radius of curvature of an object side-surface of the positive lens in the third lens group, and $R_2$ is an axial radius of curvature of an image side-surface of the positive lens in the third lens group.

6. The zoom lens system according to claim 5, which satisfies the following condition (1-1):

$$0.65 < (R_1-R_2)/(R_1+R_2) < 0.87 \tag{1-1}$$

7. The zoom lens system according to claim 1 or 2, wherein said second lens group satisfies the following condition (2):

$$0.38 < d_1/(d_1+d_2+d_3) < 0.65 \tag{2}$$

where $d_1$ is an axial thickness of the first lens in the second lens group, $d_2$ is an axial thickness of the second lens in the second lens group, and $d_3$ is an axial thickness of the third lens in the second lens group.

8. The zoom lens system according to claim 7, wherein an aperture stop is positioned on an object side of the zoom lens system with respect to said second lens group, the first lens in said second lens group is a double-convex lens, and the second lens in said second lens group is a positive convex on an object side thereof.

9. The zoom lens system according to claim 1 or 2, wherein an image side-surface of the third lens in said second lens group is a concave surface, with satisfaction of the following condition (C):

$$0.05 < d_3/(d_1+d_2+d_3) < 0.14 \quad (C)$$

where $d_1$ is an axial thickness of the first lens in the second lens group, $d_2$ is an axial thickness of the second lens in the second lens group, and $d_3$ is an axial thickness of the third lens in the second lens group.

10. The zoom lens system according to claim 2, wherein said third lens group comprises a positive lens that is of meniscus shape convex toward an image plane of the zoom lens system and satisfies the following condition (3):

$$n \leq 1.53 \quad (3)$$

where n is a refractive index of the positive lens in the third lens group.

11. The zoom lens system according to claim 1 or 2, wherein the positive lens in said third lens group is a plastic lens.

12. The zoom lens system according to claim 1 or 2, wherein said third lens group moves upon zooming from a wide-angle end to a telephoto end, with satisfaction of the following conditions (4) and (D):

$$0 < (L_1+L_2)/f_w < 1.6 \quad (4)$$

$$2.5 < f_T/f_w \quad (D)$$

where $f_w$ is a focal length of the zoom lens system at a wide-angle end, $f_T$ is a focal length of the zoom lens system at a telephoto end, $L_1$ is an absolute quantity of a difference between a position of the third lens group at the wide-angle end and a position of the third lens group in an intermediate focal length state, provided that the focal length of the zoom lens system in the intermediate focal length state is given by $(f_w \cdot f_T)^{1/2}$, and $L_2$ is an absolute quantity of a difference between the position of the third lens group in the intermediate focal length state and a position of the third lens group at the telephoto end, provided that the focal length of the zoom lens system in the intermediate focal length state is given by $(f_w \cdot f_T)^{1/2}$.

13. The zoom lens system according to claim 1 or 2, wherein said first lens group comprises, in order from an object side thereof, a first lens that is of meniscus shape concave toward an image plane of the zoom lens system, a second negative lens of double-concave shape and a third positive lens that is of meniscus shape convex on an object side thereof, with satisfaction of the following condition (5):

$$1 < (R_3-R_4)/(R_3+R_4) < 2 \quad (5)$$

where $R_3$ is an axial radius of curvature of an object side-surface of the double-concave negative lens in said first lens group, and $R_4$ is an axial radius of curvature of an image plane side-surface of the double-concave negative lens in said first lens group.

14. The zoom lens system according to claim 13, wherein refracting surfaces in said first lens group are all spherical surfaces.

15. The zoom lens system according to claim 1 or 2, which further satisfies the following conditions (6) and (7):

$$\alpha_1/(0.4 \times f_1) < -3.8 \quad (6)$$

$$|f_1/(\alpha_1+\alpha_2)| < 0.035 \quad (7)$$

where $f_1$ is a focal length of the first lens group, $\alpha_1$ is a position of an exit pupil as viewed from an image plane of the zoom lens system when the value of $\beta_2 \times \beta_3$ is $-0.40$, and $\alpha_2$ is a position of the exit pupil as viewed from the image plane when the value of $\beta_3 \times \beta_3$ is $-1.00$, with the proviso that $\beta_2$ is a transverse magnification of the second lens group upon focused at infinity, and $\beta_3$ is a transverse magnification of the third lens group upon focused at infinity.

16. The zoom lens system according to claim 1 or 2, wherein said first lens located nearest to the object side in said second lens group has both surfaces comprising aspheric surfaces.

17. The zoom lens system according to claim 1 or 2, which further comprises an aperture stop on an object side of the zoom lens system with respect to said first lens located nearest to the object side in said second lens group, wherein said aperture stop is movable together with said second lens group.

18. The zoom lens system according to claim 1, wherein said first lens group, said second lens group and said third lens group are the only lens groups of positive or negative refracting power included in said zoom lens system.

19. The zoom lens system according to claim 2, wherein said first lens group, said second lens group and said third lens group are the only lens groups of positive or negative refracting power included in said zoom lens system.

20. An electronic imaging system, comprising a zoom lens and an electronic image pickup device located on an image plane side thereof, wherein:
said zoom lens comprises, in order from an object side thereof, a first lens group of negative refracting power, located nearest to the object side, a second lens group of positive refracting power and a third lens group of positive refracting power, for zooming, said lens groups are each operable to move such that a space between adjacent lenses varies,
a total of lenses in said first lens group is 3,
said second lens group comprises three lenses, in order from an object side thereof, a first lens of positive refracting power, a second lens of positive refracting power and a third lens of negative refracting power, wherein a total of lenses in said second lens group is 3, and
said third lens group comprises a positive lens in such a meniscus form as to be convex on an image plane side thereof and satisfy the following condition (3), wherein a total of lenses in said third lens group is 1:

$$n \leq 1.53 \quad (3)$$

where n is a refractive index of the positive lens in the third lens group.

21. An electronic imaging system, comprising a zoom lens and an electronic image pickup device located on an image plane side thereof, wherein:
said zoom lens comprises, in order from an object side thereof, a first lens group of negative refracting power, located nearest to the object side, a second lens group of positive refracting power and a third lens group of positive refracting power,
for zooming, said lens groups are each operable to move such that a space between adjacent lenses varies,
a total of lenses in said first lens group is 3,
said second lens group comprises three lenses inclusive or, in order from an object side thereof, a first lens of positive refracting power, a second lens in a double-convex form of positive refracting power and a third lens in a double-concave form of negative refracting power, wherein a total of lenses in said second lens group is 3, and said third lens group comprises a positive lens in such meniscus form as to be convex on an image plane side thereof, of the zoom lens system, wherein a total of the lenses in said third lens group is 1.

22. The electronic imaging system according to claim 20, wherein said first lens group comprises, in order of an object side thereof, a first lens of negative refracting power, a second lens of negative refracting power and a third lens of positive refracting power.

23. The electronic imaging system according to claim 21, wherein said first lens group comprises, in order of an object side thereof, a first lens of negative refracting power, a second lens of negative refracting power and a third lens of positive refracting power.

24. A zoom lens system, comprising, in order from an object side thereof, a first lens group that is located nearest to the object side and has negative refracting power, a second lens group of positive refracting power and a third lens group of positive refracting power, in which zooming is carried out by each movement of the first, the second, and the third lens group with a change in each space between adjacent lens groups, wherein:
   said second lens group comprises three lenses inclusive of, in order from an object side thereof, a first lens which is a positive lens, a second lens which is a positive lens and a third lens which is a negative lens, wherein said second lens and said third lens are cemented together into a cemented lens, and a total of the lenses in the second lens group is 3, with satisfaction of the following condition (11):

$$\nu_{d1} > 70 \quad (11)$$

where $\nu_{d1}$ is an Abbe number of the positive lens in the cemented lens in the second lens group.

25. The zoom lens system according to claim 24, which satisfies the following condition (11-1):

$$75 > \nu_{d1} > 70 \quad (11\text{-}1).$$

26. The zoom lens system according to claim 24, wherein said cemented lens in said second lens group satisfies the following condition (12):

$$\nu d1 - \nu d2 > 45 \quad (12)$$

where $\nu_{d2}$ is an Abbe number of the negative lens in the cemented lens in the second lens group.

27. The zoom lens system according to claim 26, which satisfies the following condition (12-1):

$$60 > \nu_{d1} - \nu_{d2} > 45 \quad (12\text{-}1).$$

28. The zoom lens system according to claim 24, wherein said first lens group comprises, in order from an object side thereof, a first lens that is of meniscus shape concave on an image plane side thereof, a second lens group that has negative refracting power and is of meniscus shape concave on an image plane side thereof, and a third lens that has positive refracting power and is of meniscus shape convex on an image plane side thereof.

29. The zoom lens system according to claim 28, wherein said third lens group comprises one double-convex positive lens.

30. The zoom lens system according to claim 28, wherein either one of refracting surfaces of the second lens in said first lens group and an object side-surface in said third lens group are each an aspheric surface.

31. The zoom lens system according to claim 24, wherein said first lens group comprises three lenses inclusive of, in order from an object side thereof, a first negative lens, a second negative lens and a third positive lens and said third lens group comprises one positive lens, wherein a total of the lenses in the first lens group is 3 and a total of the lenses in the third lens group is 1, with satisfaction of the following conditions (13-1) and (13-2):

$$n_1 \leq 1.53 \quad (13\text{-}1)$$

$$n_3 \leq 1.53 \quad (13\text{-}2)$$

where $n_1$ is a refractive index of the second negative lens in the first lens group, and $n_3$ is a refractive index of the positive lens in the third lens group.

32. The zoom lens system according to claim 31, which satisfies the following conditions (13-1)' and (13-2)':

$$1.45 < n_1 \leq 1.53 \quad (13\text{-}1)'$$

$$1.45 < n_3 \leq 1.53 \quad (13\text{-}2)'.$$

33. The zoom lens system according to claim 24, wherein said first lens group comprises three lenses inclusive of, in order from an object side thereof, a first negative lens, a second negative lens and a positive lens and said third lens group comprises one positive lens, wherein a total of the lens in the first lens group is 3 and a total of the lens in the third lens group is 1, and the second negative lens in said first lens group and the positive lens in said third lens group are each a plastic lens.

34. The zoom lens system according to claim 24, wherein said first lens group comprises three lenses inclusive of, in order from an object side thereof, a first negative lens, a second negative lens and a positive lens, wherein the second negative lens in said first lens group satisfies the following condition (14):

$$0.3 < (R_{12o} - R_{12i})/(R_{12o} + R_{12i}) < 0.5 \quad (14)$$

where $R_{12o}$ is an axial radius of curvature of an object side-surface of the second negative lens in the first lens group, and $R_{12i}$ is an axial radius of curvature of an image plane side-surface of the second negative lens in the first lens group.

35. The zoom lens system according to claim 24, wherein said third lens group comprises one positive lens and a total of the lens in the third lens group is 1, and the positive lens in said third lens group satisfies the following condition (24):

$$1.1 < (R_{3o} - R_{3i})/(R_{3o} + R_{3i}) < 2.0 \quad (15)$$

where $R_{3o}$ is an axial radius of curvature of an object side-surface of the positive lens in the third lens group, and $R_{3i}$ is an axial radius of curvature of an image plane side-surface of the positive lens in the third lens group.

36. The zoom lens system according to claim 24, wherein the first lens located nearest to the object side in said second lens group comprises an aspheric surface.

37. The zoom lens system according to claim 24, which further comprises an aperture stop on an object side of the zoom lens system with respect to said first lens located nearest to the object side in said second lens group, wherein said aperture stop is movable together with said second lens group.

38. The zoom lens system according to claim 24, wherein lens groups having positive or negative lens groups, included in said zoom lens system, are only said first lens group, said second lens group and said third lens group.

39. An electronic imaging system, comprising a zoom lens system and an image pickup device located on an image plane side thereof, wherein said zoom lens system comprises, in order from an object side thereof, a first lens group that is located nearest to the object side and has negative refracting power, a second lens group of positive refracting power and a third lens group of positive refracting power, in which zooming is carried out by each movement of the first, the second, and the third lens group with a change in each space between adjacent lens groups, wherein:

said second lens group comprises three lenses inclusive of, in order from an object side thereof, a first lens which is a positive lens, a second lens which is a positive lens and a third lens which is a negative lens, and a total of the lenses in the second lens group is 3, wherein said second lens and said third lens are cemented together into a cemented lens, with satisfaction of the following condition (11) with respect to an Abbe number of the positive lens in said cemented lens:

$$\nu_{d1} > 70 \qquad (11)$$

where $\nu_{d1}$ is the Abbe number of the positive lens in the cemented lens in the second lens group.

* * * * *